US012726068B2

(12) United States Patent
Li et al.

(10) Patent No.: US 12,726,068 B2
(45) Date of Patent: Sep. 1, 2026

(54) STATOR ASSEMBLY, MOTOR AND POWERTRAIN

(71) Applicant: ZHUHAI ENPOWER ELECTRIC CO., LTD., Zhuhai City (CN)

(72) Inventors: Zhongyu Li, Zhuhai City (CN); Guibin Jiang, Zhuhai City (CN); Hongxin Liu, Zhuhai City (CN); Peng Xin, Zhuhai City (CN); Lixuan Zheng, Zhuhai City (CN); Linyang Lv, Zhuhai City (CN)

(73) Assignee: ZHUHAI EMPOWER ELECTRIC CO., LTD., Zhuhai (CN)

( * ) Notice: Subject to any disclaimer, the term of this patent is extended or adjusted under 35 U.S.C. 154(b) by 213 days.

(21) Appl. No.: 18/888,050

(22) Filed: Sep. 17, 2024

(65) Prior Publication Data

US 2025/0015659 A1 Jan. 9, 2025

Related U.S. Application Data

(62) Division of application No. 18/839,413, filed as application No. PCT/CN2022/132235 on Nov. 16, 2022.

(30) Foreign Application Priority Data

Feb. 16, 2022 (CN) ........................ 202210139423.6
Sep. 5, 2022 (CN) ........................ 202222372175.8

(51) Int. Cl.
*H02K 3/28* (2006.01)
*B60L 15/00* (2006.01)
(Continued)

(52) U.S. Cl.
CPC ................ *H02K 3/28* (2013.01); *B60L 15/00* (2013.01); *H02K 1/16* (2013.01); *H02K 3/50* (2013.01); *H02K 2203/06* (2013.01)

(58) Field of Classification Search
CPC H02K 1/16; H02K 1/165; H02K 3/04; H02K 3/12; H02K 3/28; H02K 3/50;
(Continued)

(56) References Cited

U.S. PATENT DOCUMENTS 6,664,677 B2 12/2003 Tanaka
9,843,232 B2 * 12/2017 Shibata .................... H02K 3/28
(Continued)

FOREIGN PATENT DOCUMENTS

CN 102077444 A 5/2011
CN 102714441 A 10/2012
(Continued)

OTHER PUBLICATIONS

The search report of counterpart EP application No. 24208993.6 issued on Feb. 3, 2025.

(Continued)

*Primary Examiner* — Edgardo San Martin
(74) *Attorney, Agent, or Firm* — The Sun IP Law

(57) ABSTRACT

The disclosure provides a stator assembly, a motor, a powertrain and a vehicle, the stator assembly includes a stator core and a stator winding, the stator core is provided with a plurality of stator slots, the plurality of stator slots are distributed along a circumferential direction of the stator core, a winding part of one winding wire of each phase of the stator winding is arranged in the plurality of stator slots, a leading-out end of one winding wire of each phase is located on a radial inner side of the winding part based on the stator core, and the leading-out end of one winding wire of each phase is uniformly distributed along the circumferential direction of the stator core.

11 Claims, 14 Drawing Sheets

(51) Int. Cl.
*H02K 1/16* (2006.01)
*H02K 3/50* (2006.01)
*H02K 3/52* (2006.01)

(58) Field of Classification Search
CPC .......... H02K 3/52; H02K 3/521; H02K 3/522; H02K 2203/06; H02K 2203/09
See application file for complete search history.

(56) References Cited

U.S. PATENT DOCUMENTS

| | | | | |
|---|---|---|---|---|
| 10,923,978 | B2 * | 2/2021 | Shiah | H02K 1/165 |
| 11,063,489 | B2 | 7/2021 | Dameron | |
| 2002/0033646 | A1 | 3/2002 | Tanaka | |
| 2003/0218394 | A1 | 11/2003 | Hashiba | |
| 2012/0019081 | A1 * | 1/2012 | Tamura | H02K 15/35 310/43 |
| 2015/0076945 | A1 | 3/2015 | Kudou | |
| 2016/0006314 | A1 | 1/2016 | Kaneshige | |
| 2025/0167619 | A1 * | 5/2025 | Li | B60L 15/00 |

FOREIGN PATENT DOCUMENTS

| | | | | | |
|---|---|---|---|---|---|
| CN | 103107625 | A | | 5/2013 | |
| CN | 103346636 | A | | 10/2013 | |
| CN | 105743288 | A | | 7/2016 | |
| CN | 109451775 | A | | 3/2019 | |
| CN | 109586464 | A | | 4/2019 | |
| CN | 209516762 | U | * | 10/2019 | |
| CN | 110556936 | A | * | 12/2019 | H02K 3/28 |
| CN | 110784042 | A | * | 2/2020 | H02K 3/12 |
| CN | 110912326 | A | * | 3/2020 | H02K 11/225 |
| CN | 111478465 | A | * | 7/2020 | H02K 3/50 |
| CN | 111564921 | A | | 8/2020 | |
| CN | 111668960 | A | | 9/2020 | |
| CN | 212033858 | U | * | 11/2020 | |
| CN | 112436618 | A | * | 3/2021 | H02K 1/165 |
| CN | 112448498 | A | | 3/2021 | |
| CN | 112821595 | A | * | 5/2021 | H02K 3/28 |
| CN | 113422455 | A | | 9/2021 | |
| CN | 214380368 | U | | 10/2021 | |
| CN | 110556956 | B | * | 12/2021 | H02K 3/28 |
| CN | 113809858 | A | | 12/2021 | |
| CN | 215646428 | U | | 1/2022 | |
| CN | 114204725 | A | | 3/2022 | |
| CN | 114629272 | A | * | 6/2022 | H02K 3/04 |
| CN | 115037068 | A | * | 9/2022 | H02K 3/12 |
| CN | 115459496 | A | * | 12/2022 | H02K 3/28 |
| CN | 218549607 | U | * | 2/2023 | |
| CN | 116961286 | A | * | 10/2023 | H02K 3/12 |
| CN | 114649880 | B | * | 12/2023 | H02K 1/16 |
| CN | 220797915 | U | * | 4/2024 | |
| CN | 221929435 | U | * | 10/2024 | |
| CN | 111478465 | B | * | 6/2025 | H02K 3/50 |
| JP | 2004297881 | A | | 10/2004 | |
| JP | 2011182512 | A | | 9/2011 | |
| JP | 2012231573 | A | | 11/2012 | |
| JP | 2013102633 | A | | 5/2013 | |
| JP | 2017085756 | A | | 5/2017 | |
| KR | 1020020018550 | A | | 3/2002 | |
| WO | WO-2019062905 | A1 | * | 4/2019 | H02K 3/50 |
| WO | 2021061795 | A | | 4/2021 | |
| WO | WO-2021237991 | A1 | * | 12/2021 | H02K 3/28 |

OTHER PUBLICATIONS

The extended European search report of counterpart EP application No. 22926814.9 issued on Jan. 9, 2026.

The first office action of counterpart JP application No. 2024-547891 issued on Oct. 14, 2025.

The Notice of Allowance of counterpart KR application No. 10-2024-7030952 issued on Jul. 29, 2025.

The international search report of PCT application No. PCT/CN2022/132235 mailed Jan. 11, 2023.

The first office action in CN Appl. No. 202210139423.6 dated Mar. 20, 2022.

The second office action in CN Appl. No. 202210139423.6 dated Apr. 13, 2022.

* cited by examiner

STATOR ASSEMBLY, MOTOR AND POWERTRAIN

CROSS-REFERENCE TO RELATED APPLICATION

The disclosure claims the priority to the Chinese Patent Application No. CN202210139423.6 filed on Feb. 16, 2022 and Chinese Patent application No. CN202222372175.8 filed on Sep. 5, 2022, which are hereby incorporated by reference in their entireties

TECHNICAL FIELD

The disclosure relates to the technical field of motors, and in particular to a stator assembly, a motor, a powertrain and a vehicle.

BACKGROUND

A new energy vehicle has the characteristics of environmental protection, small pollution and the like because it generates power without burning gasoline or diesel oil, and with vigorous popularization and application of new energy power generation such as hydroenergy, wind energy, solar energy, nuclear energy and the like, many new energy vehicles are gradually being popularized and applied, such as new energy electric cars, new energy electric coaches, new energy electric trucks, new energy electric cleaning vehicles, new energy electric rail vehicles, new energy electric flying vehicles, new energy electric shipping vehicles and the like.

The new energy vehicle is generally provided with a battery, a motor control apparatus, a motor and a power generation apparatus, a power tube in the motor control apparatus receives direct current output by the battery, inverts the direct current into alternating current and outputs the alternating current to the motor, and then the motor outputs rotary driving force to drive the power generation apparatus such as wheels, blades and the like to drive the vehicle to move.

With integration of the vehicle to a driving assembly, namely, the motor and the motor control apparatus, the occupied space of devices needs to be further optimized and reduced, so as to make more space for use of riding space, battery space, etc.

A motor controller in the related art is arranged on one radial side of the motor, and a lead wire and a neutral wire of a stator winding in the motor are both located on the radial outer side, for ease of being connected with the motor controller on the radial outer side, and then the lead wire and the neutral wire are collectively led out to facilitate connection with the motor controller. Such design structure is not only inconvenient for miniaturization of the motor, but also affects the performance of the motor because the positions of the lead wire and neutral wire are unevenly distributed with the relative positions of each pole winding, and then the resistance of each phase is unbalanced, resulting in relative unevenness of current of each phase, thereby affecting the performance of the motor.

In addition, in order to facilitate welding of the neutral wire and the winding, connecting ends of the neutral wire, lead wire ends and the winding are all arranged towards the outer side in the axial direction so as to facilitate welding together, which is not conducive to compliance arrangement of electrical gaps among the terminals, thus influencing the stability of electrical performance to a certain extent.

SUMMARY

A first objective of the disclosure is to provide a stator assembly with lead wire ends uniformly distributed on a radial inner side.

A second objective of the disclosure is to provide a motor with the above stator assembly.

A third objective of the disclosure is to provide a powertrain with the above motor.

A fourth objective of the disclosure is to provide a vehicle with the above motor.

A fifth objective of the disclosure is to provide a stator assembly in which star point connection ends are reversely arranged.

A sixth objective of the disclosure is to provide a motor with the above stator assembly.

A seventh objective of the disclosure is to provide a powertrain with the above motor.

An eighth objective of the disclosure is to provide a vehicle with the above motor.

Technical Solution

In order to achieve the first objective of the disclosure, some embodiments of the disclosure provide a stator assembly, which includes a stator core and a stator winding, the stator core is provided with a plurality of stator slots, the plurality of stator slots are distributed along a circumferential direction of the stator core, a winding part of one winding wire of each phase of the stator winding is arranged in the plurality of stator slots, a leading-out end of one winding wire of each phase is located on a radial inner side of the winding part based on the stator core, and the leading-out end of one winding wire of each phase is uniformly distributed along the circumferential direction of the stator core.

In some embodiments, a star point end of one winding wire of each phase is located on the radial inner side of the winding part based on the stator core, and the star point end of one winding wire of each phase is uniformly distributed along the circumferential direction of the stator core.

In some embodiments, in an axial projection of the stator core, a projection of the leading-out end is located on a radial inner side of a projection of the star point end based on the stator core.

In some embodiments, the stator assembly further includes a neutral connecting plate, the neutral connecting plate is in an arc-shaped or ring-shaped, the neutral connecting plate is provided with a plurality of neutral connecting ends, and the plurality of neutral connecting ends are connected to the star point end.

In some embodiments, the neutral connecting plate is located on a radial inner side of the winding part; in the axial projection of the stator core, a projection of the neutral connecting plate is located on the radial inner side of the projection of the star point end based on the stator core, and the projection of the leading-out end is located on a radial inner side of the projection of the neutral connecting plate based on the stator core.

In some embodiments, each phase of the stator winding is provided with two winding wires, winding parts of the two winding wires of each phase are arranged in the plurality of stator slots; leading-out ends of the two winding wires of each phase are located on the radial inner side of the winding part based on the stator core, the leading-out ends of the two winding wires of each phase are respectively led out from two adjacent stator slots of the plurality of stator slots, a first winding wire and a second winding wire of the same phase are arranged in parallel, the leading-out end of the first winding wire of each phase is uniformly distributed along the circumferential direction of the stator core, and the leading-out end of the second winding wire of each phase is uniformly distributed along the circumferential direction of the stator core.

In some embodiments, star point ends of the two winding wires of each phase are all located on the radial inner side of the winding part based on the stator core, the star point ends of the two winding wires of each phase are respectively led out from two adjacent stator slots of the plurality of stator slots, the star point end of the first winding wire of each phase is uniformly distributed along the circumferential direction of the stator core, and the star point end of the second winding wire of each phase is uniformly distributed along the circumferential direction of the stator core.

In some embodiments, in the axial projection of the stator core, a projection of the leading-out end of the same winding wire of each phase is located on a radial inner side of a projection of the star point end of the same winding wire of each phase based on the stator core.

In some embodiments, the stator assembly further includes a neutral connecting plate, the neutral connecting plate is in an arc-shaped or ring-shaped, the neutral connecting plate is provided with a plurality of single-phase connecting groups, each of the plurality of single-phase connecting groups includes at least two neutral connecting ends adjacently arranged, and the at least two neutral connecting ends are connected to the star point ends.

In some embodiments, the neutral connecting plate is located on a radial inner side of the winding part; and along the radial direction of the stator core, the neutral connecting plate is located between the star point end and the leading-out end of the same winding wire.

In some embodiments, each of the plurality of stator slots is provided with a plurality of slot layers, the plurality of slot layers are distributed along a radial direction of the stator core, the leading-out end is led out from an innermost slot layer of the plurality of slot layers, and the star point end is led out from a secondary innermost slot layer of the plurality of slot layers.

In some embodiments, the stator assembly further includes a single-phase terminal, the single-phase terminal is located on a radial inner side of the winding part, the single-phase terminal is provided with an access end, and the access end is connected to the leading-out end.

In some embodiments, each of the plurality of stator slots is provided with a plurality of slot layers, the plurality of slot layers are distributed along a radial direction of the stator core, the leading-out end is led out from an innermost slot layer of the plurality of slot layers, and the star point end is led out from a secondary innermost slot layer of the plurality of slot layers; one winding wire of each phase of the stator winding is formed by two branch winding wires connected in series, leading-out ends of the two branch winding wires are respectively led out from two adjacent stator slots of the plurality of stator slots, and star point ends of the two branch winding wires are respectively led out from two adjacent stator slots of the plurality of stator slots; and the stator assembly further includes a series member, the series member is connected between the star point end of one branch winding wire and the leading-out end of the other branch winding wire.

In order to achieve the second objective of the disclosure, some embodiments of the disclosure provide a motor, which includes a rotor assembly, and a stator assembly described above, and the rotor assembly is rotatably arranged in the stator core.

In order to achieve the third objective of the disclosure, some embodiments of the disclosure provide a powertrain, which includes the motor described above and a motor control apparatus, the motor control apparatus is connected at an axial end of the motor, a single-phase terminal is provided in a middle of the motor control apparatus, and the leading-out end is connected to the single-phase terminal, there are at least three single-phase terminals, and the at least three single-phase terminals are uniformly distributed along a circumferential direction.

In order to achieve the fourth objective of the disclosure, some embodiments of the disclosure provide a vehicle, which includes the motor described above.

In order to achieve the fifth objective of the disclosure, some embodiments of the disclosure provide a stator assembly, which includes a stator core, a stator winding and a neutral connecting assembly, the stator core is provided with a plurality of stator slots, the plurality of stator slots are distributed along a circumferential direction of the stator core, each of the plurality of stator slots is provided with a plurality of slot layers, the plurality of slot layers are distributed along a radial direction of the stator core, and winding parts of two winding wires of each phase of the stator winding are arranged in the plurality of stator slots; leading-out ends of the two winding wires of each phase are located on a radial inner side of the winding part based on the stator core, the leading-out ends of the two winding wires of each phase are respectively led out from an innermost slot layers of the plurality of slot layers of two adjacent stator slots of the plurality of stator slots, a leading-out end of a first winding wire of each phase is uniformly distributed along the circumferential direction of the stator core, and a leading-out end of a second winding wires of each phase is uniformly distributed along the circumferential direction of the stator core; star point ends of the two winding wires of each phase are located on the radial inner side of the winding part based on the stator core, the star point ends of the two winding wires of each phase are respectively led out from a secondary innermost slot layer of the plurality of slot layers of two adjacent stator slots of the plurality of stator slots, a stair point end of the first winding wire of each phase is uniformly distributed along the circumferential direction of the stator core, and a star point end of the second winding wire of each phase is uniformly distributed along the circumferential direction of the stator core; both the leading-out ends and the star point ends are led out towards an axial outer side of the stator core, in an axial projection of the stator core, a projection of the leading-out ends is located on a radial inner side of a projection of the star point ends based on the stator core; the neural connecting assembly includes a star point connecting plate and an arc-shaped connecting plate, and there are at least three star point connecting plates and at least three arc-shaped connecting plates, a welding flat plate is provided in a middle of the star point connecting plate, a first connecting end is provided on each of two sides of the welding flat plate, a second connecting end is provided at each of two ends of the arc-shaped connecting plate, the star point connecting plate and the arc-shaped connecting plate are connected in sequence at intervals, one first connecting end is welded with one connecting end, the first connecting end and the second connecting end are located on an axial inner side of the star point ends based on the stator core, the welding flat plate is located between the leading-out end and the star point ends, and the welding plate is connected to two star point ends of each phase.

In some embodiments, the first connecting end and the second connecting end are led out towards an axial inner side of the stator core.

In some embodiments, the arc-shaped connecting plate is located on a radial inner side of the winding part.

In some embodiments, the second connecting end is located on a radial inner side of the first connecting end based on the stator core.

In some embodiments, a connecting arm is provided on each of two sides of the welding flat plate, a fixing end of the connecting arm is close to the axial inner side of the stator core and is connected to the welding flat plate, and the first connecting end is located at a free end of the connecting arm.

In some embodiments, the star point connecting plate is formed by integrated stamping.

In some embodiments, the arc-shaped connecting plate is formed by integrated stamping.

In order to achieve the sixth objective of the disclosure, some embodiments of the disclosure provide a motor, which includes a rotor assembly, and the stator assembly described above, and the rotor assembly is rotatably arranged in the stator core.

In order to achieve the seventh objective of the disclosure, some embodiments of the disclosure provide a powertrain, which includes the motor described above and a motor control apparatus, the motor control apparatus is connected to an axial end of the motor, a single-phase terminal is provided in a middle of the motor control apparatus, and the leading-out end is connected to the single-phase terminal, there are at least three single-phase terminals, the at least three single-phase terminals are uniformly distributed along a circumferential direction.

In order to achieve the eighth objective of the disclosure, some embodiments of the disclosure provide a vehicle, which includes the motor described above.

Beneficial Effects

The leading-out end is arranged on the radial inner side of the winding part and uniformly distributed along the circumferential direction, the star point end is able to be distributed on the outer side or inner side and a star connection method or a delta connection method is able to be adopted according to requirements, then the resistance of each phase is able to be balanced, the current in each phase is able to be balanced, thus the operation stability and related performance of the motor are improved, meanwhile, the axial space and radial inner space of the motor are fully utilized, the end height and radial arrangement space of the motor winding are reduced as a whole, which is beneficial for reducing use of the volume of the motor of the stator assembly.

In addition, the star point end is arranged on the radial inner side of the winding part and uniformly distributed along the circumferential direction, in match with uniform distribution of the leading-out end on the inner side, the resistance of each phase is able to be further balanced, and the current in each phase is able to be further balanced, meanwhile, wiring connection is better facilitated.

Moreover, the leading-out end is arranged more close to the radial inner side, so that connection and wiring of the star point end of each phase are facilitated, the neutral connecting plate in the arc-shaped or ring-shaped is connected to each star point, so that connection and arrangement of the star point are facilitated, meanwhile, the neutral connecting plate is distributed relative to the radial inner side of the star point end, so that the arrangement structure of the winding is able to be avoided, thus the gap of each part is uniform, and meanwhile, the space of the end of the winding is able to be saved.

Moreover, the leading-out ends of the two winding wires connected in parallel of each phase are all located on the radial inner side of the winding part, and the leading-out ends of the corresponding winding wires of each phase are uniformly distributed along the circumferential direction, the star point end is able to be distributed on the outer side or inner side and a star connection method or a delta connection method is able to be adopted according to requirements, then the resistance of each phase is able to be balanced, the current in each phase is able to be balanced, thus the operation stability and related performance of the motor are improved, meanwhile, by utilizing leading-out of adjacent stator slots, two leading-out ends are adjacent distributed, so that connection and use are facilitated, meanwhile, the axial space and radial inner space of the motor are fully utilized, the end height and radial arrangement space of the motor winding are reduced as a whole, which is beneficial for reducing use of the volume of the motor of the stator assembly.

In addition, the star point ends are arranged on the radial inner side of the winding part and uniformly distributed along the circumferential direction, in match with uniform distribution of the leading-out ends on the inner side, the resistance of each phase is able to be further balanced, the current in each phase is able to be further balanced, meanwhile, the star point ends are also led out from adjacent stator slots, so that wiring connection is better facilitated.

Moreover, the leading-out ends are arranged more close to the radial inner side, so that connection and wiring of the star point ends of each phase are facilitated, the neutral connecting plate in the arc-shaped or ring-shaped is connected to each star point, so that connection and arrangement of the star point are facilitated, meanwhile, the neutral connecting plate is distributed relative to the radial inner side of the star point ends, so that the arrangement structure of the winding is able to be avoided, thus the gap of each part is uniform, and meanwhile, the space of the end of the winding is able to be saved.

Moreover, the leading-out ends are led out from the innermost slot layer, so that external connection for use is facilitated, the star point ends are led out from the secondary innermost slot layer, the star point ends are able to be conveniently connected to the star point ends of other phases, so that intervention of wiring is able to be avoided, and wiring and layout are optimized.

In addition, the single-phase terminal arranged on the radial inner side is connected to the leading-out ends, through the single-phase terminal, connection to the motor controller is facilitated, meanwhile, the radial inner space is fully utilized further, and the end height and radial arrangement space of the motor winding are reduced as a whole, which is beneficial for reducing use of the volume of the motor of the stator assembly.

Two leading-out ends and star point ends of one winding wire formed by serial connection are respectively located on two adjacent stator slots, then the series member is able to be connected between one star point end and another leading-out end, so that serial wiring layout is achieved.

In addition, through the leading-out ends on the radial inner side which are uniformly distributed along the circumferential direction, the motor controller connected and matched therewith is able to be provided with the corresponding single-phase terminals uniformly distributed in the circumferential direction, so that the motor controller is able to be distributed at the axial end of the motor, by utilizing highly integrated arrangement, the radial arrangement space is reduced, the occupied space is effectively reduced, the space utilization rate is improved, the highly integrated driving assembly is achieved, and device arrangement space of the vehicle is saved.

The leading-out ends and the star point ends are arranged on the radial inner side of the winding part and uniformly distributed along the circumferential direction, then the resistance of each phase is able to be balanced, the current in each phase is able to be balanced, thus the operation stability and related performance of the motor are improved, meanwhile, the axial space and radial inner space of the motor are fully utilized, the end height and radial arrangement space of the motor winding are reduced as a whole, which is beneficial for reducing use of the volume of the motor of the stator assembly.

In addition, both the leading-out ends and the star point ends are led out towards the axial outer side, the first connecting end and the second connecting end are both located on the axial inner side, and further led out towards the axial inner side, then the distances between the two connecting ends and the leading-out end and the star point end in the axial direction are lengthened, therefore, the creepage distance is able to be increased, the electrical safety is able to be improved, meanwhile, the axial end height of the motor is able to be reduced, which is more conducive to integrated arrangement of devices. In addition, the stability of the welding connection is able to be improved by welding two star point ends at the same time through the welding flat plate. In addition, the star point connecting plate and the arc-shaped connecting plate are in split arrangement, and are formed by integrated stamping, so that the neutral connecting assembly is low in cost and easy to manufacture.

The disclosure will be further described with reference to drawings and embodiments.

DETAILED DESCRIPTION OF THE EMBODIMENTS

Embodiment 1 of Stator Assembly

Referring to FIGS. 1-4, a stator assembly includes a stator core 11 and a stator winding 3, the stator core 11 is provided with a plurality of stator slots 12, the plurality of stator slots 12 are distributed along a circumferential direction of the stator core 11, in the embodiment, a number of the plurality of stator slots is 48, a number of phases is three, the three phases include a U-phase, a V-phase, and a W-phase, each of the plurality of stator slots 12 is provided with a plurality of slot layers, the plurality of slot layers are distributed along a radial direction of the stator core 11, the plurality of slot layers are respectively an a-th layer, a b-th layer, a c-th layer, a d-th layer, an e-th layer, and a f-th layer from inside to outside along the radial direction, a number of poles is 2p=8 (that is, a number of pole-pairs is 4), the number of pole-pairs p is 8 poles, 4 poles, and the like, in addition, the number of phases is three, two or single, the number of the plurality of stator slots is 24, 48, 72, and the like, the number of the plurality of slot layers is also other number, and the above stator parameter variations are able to be set according to specific motor application.

The stator winding 3 includes a U-phase winding, a V-phase winding and a W-phase winding, in the embodiment, a flat wire is utilized and a wave winding manner is adopted for arrangement, the flat wire is inserted into a corresponding slot layer of a stator slot, a starting point of a winding wire is from an innermost layer to an outermost layer in a clockwise winding manner, then from the outermost layer to the innermost layer, to the tail end, from the innermost layer to the outermost layer in an anticlockwise winding manner through an adapter, then from the outermost layer to the innermost layer, after an end of each flat wire deflects, the axial two ends are welded, and finally, the star point ends of each phase are welded together through a neutral wire.

Figure 3:
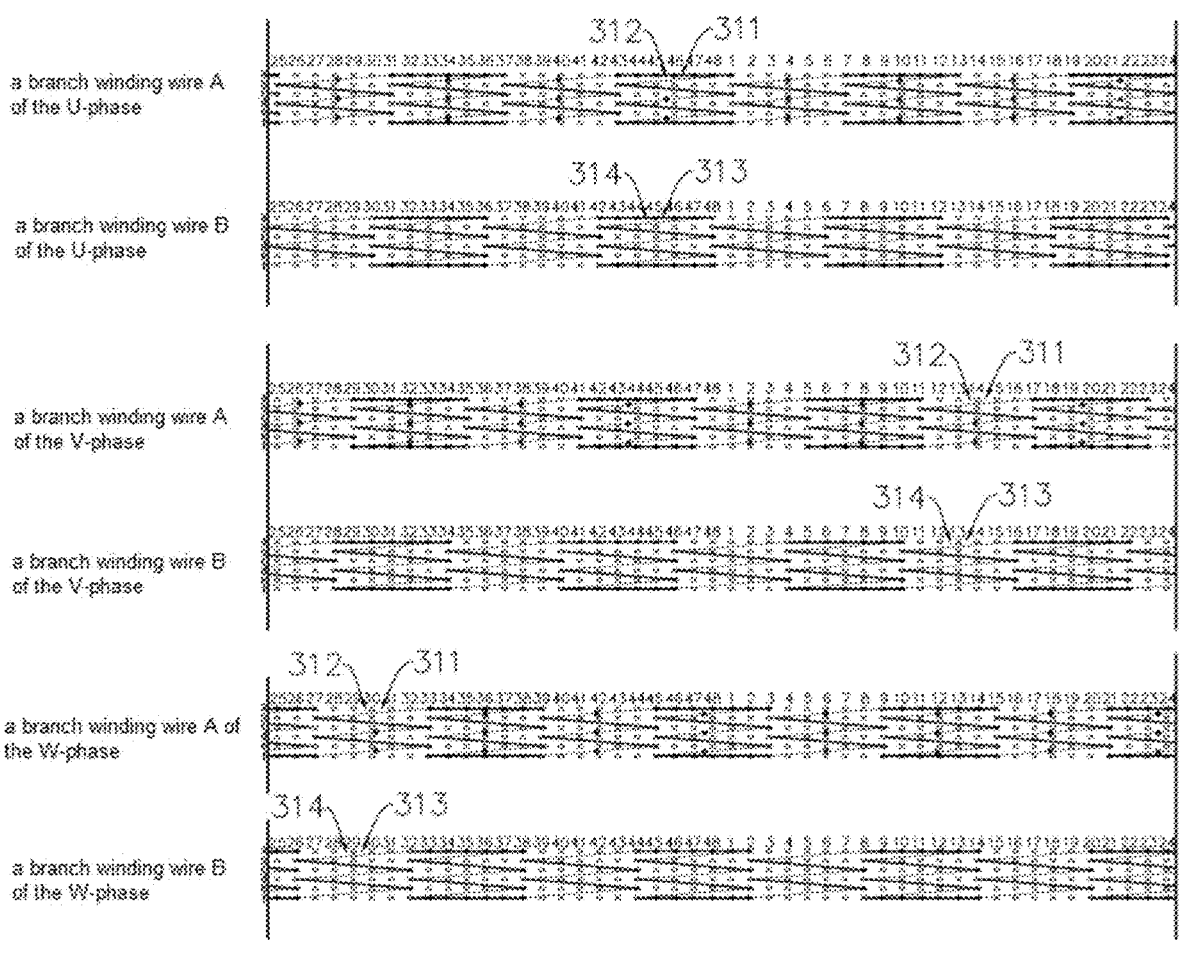
FIG. 3 is a schematic diagram of a winding of Embodiment 1 of a stator assembly of the disclosure.

Specifically, each phase of winding is arranged in one winding wire, the U-phase is taken as an example, one winding wire of the U-phase is formed by a branch winding wire A and a branch winding wire B connected in series, a first leading-out end 311 of the branch winding wire A of the U-phase is led out from the innermost slot layer (the a-th layer) of the 1st slot, winding arrangement is carried out according to a winding schematic diagram shown in FIG. 3, a thick line in the figure is a wire inserting end, a thin line is a welding end, after the branch winding wire A of the U-phase is arranged for one circle, a first star point end 312 is led out from the secondary innermost slot layer (the b-th layer) of the 43th slot, and along with deflection of the end of the winding wire, the first leading-out end 311 and the first star point end 312 deflect to a position opposite the 46th slot.

An first leading-out end 311 of the branch winding wire B of the U-phase is led out from the innermost slot layer (the a-th layer) of the 48th slot, after the branch winding wire B of the U-phase is arranged for one circle, a first star point end 312 is led out from the secondary innermost slot layer (the b-th layer) of the 42th slot, and along with deflection of the end of the winding wire, the second leading-out end 313 and the second star point end 314 deflect to a position opposite the 45th slot. The stator assembly further includes a series member 33, a first end 331 of the series member 33 is connected to the first star point end 312, a second end 332 of the series member 33 is connected to the second leading-out end 313, so that arrangement of one winding wire of the U-phase is achieved, the first leading-out end 311 serves as the leading-out end of the U-phase winding for external connection for use, and the second star point end 314 serves as the star point end of the U-phase winding for connection to star point ends of other phases for use.

The V-phase winding and the W-phase winding are both the same as the U-phase in winding, connecting manner and leading-out manner, specifically, arrangement is able to be carried out referring to the winding schematic diagram shown in FIG. 3, the first leading-out end 311 of the V-phase winding is led out from the a-th layer of the 17th slot, the second star point end 314 of the V-phase winding is led out from the b-th layer of the 10th slot, the leading-out end 311 of the W-phase winding is led out from the a-th layer of the 33rd slot, and the second star point end 314 of the W-phase winding is led out from the b-th layer of the 26th slot.

The first leading-out end 311, the first star point end 312, the second leading-out end 313 and the second star point end 314 of one winding wire of each phase are located on a radial inner side of the winding part 31 based on the stator core 11, the leading-out ends of one winding wire of each phase are uniformly distributed along a circumferential direction of the stator core 11, the star point ends of one winding wire of each phase are uniformly distributed along the circumferential direction of the stator core 11, more specifically, in an axial projection of the stator core 11, a projection of the first leading-out end 311 is located on a radial inner side of a projection of the first star point end 312 based on the stator core 11, a projection of the second leading-out end 313 is located on a radial inner side of a projection of the second star point end 314 based on the stator core 11, the first leading-out end 311 of the U-phase winding, the first leading-out end 311 of the V-phase winding and the first leading-out end 311 of the W-phase winding are circumferentially and uniformly distributed with an included angle of 120°, and the second star point end 314 of the U-phase winding, the second star point end 314 of the V-phase winding and the second star point end 314 of the W-phase wind are circumferentially and uniformly distributed with an included angle of 120°.

The stator assembly further includes a first neutral connecting plate 32 extending in an arc shape, the first neutral connecting plate 32 includes an arc-shaped plate and a plurality of single-phase connecting groups, the arc-shaped plate includes a first arc-shaped portion 320 and a first external protruding portion 322, and there are two first arc-shaped portions 320 and three first external protruding portions 322, the first arc-shaped portion 320 of the arc-shaped plate is arranged in a concentric arc extension manner, the first arc-shaped portion 320 and the first external protruding portion 322 are sequentially connected at intervals, an outer diameter of the first external protruding portion 322 is greater than that of the first arc-shaped portion 320, each single-phase connecting group is arranged on each the first external protruding portion 322, each single-phase connecting group is arranged on an axial end surface of the first external protruding portion 322 based on an axial direction of the arc-shaped plate, the first external protruding portion 322 includes a plane section and a connecting section located on one side or both sides of the plane section, one connecting section is connected to the first arc-shaped portion 320 on the same side, and the plane section protrudes out of the first arc-shaped portion 320.

In the embodiment, a number of a first neutral connecting end 321 of each single-phase connecting group is one, the first neutral connecting end 321 is centrally arranged on an axial end surface of the plane section, the first neutral connecting end 321 extends along the axial direction of the arc-shaped plate, first neutral connecting ends 321 of the plurality of single-phase connecting groups are uniformly distributed on the arc-shaped plate along the circumferential direction, two first neutral connecting ends 321 are arranged at two ends of the arc-shaped plate, a partition portion is provided between the two ends, and the first neutral connecting ends 321, the first arc-shaped portion 320 and the first external protruding portion 322 are integrally formed.

The first arc-shaped portion 320 extending on the inner side is configured for avoiding the welding end of the winding wire, the first arc-shaped portion 320 of the neutral connecting plate 32 is located on the radial inner side of the winding part 31, in the axial projection of the stator core 11, a projection of the first neutral connecting plate 32 is located on a radial inner side of a projection of the first star point end 312 based on the stator core 11, a projection of the first leading-out end 311 is located on a radial inner side of the projection of the first neutral connecting plate 32 based on the stator core 11, then the first neutral connecting end 321 of the first external protruding portion 322 extends to an outer side of the second leading-out end 313 and is welded with the second star point end 314, and three first neutral connecting ends 321 of the first neutral connecting plate 32 are respectively connected to the second star point ends 314 of the U-phase, the V-phase and the W-phase, thus achieving a star connection method.

Embodiment 2 of Stator Assembly

Figure 5:
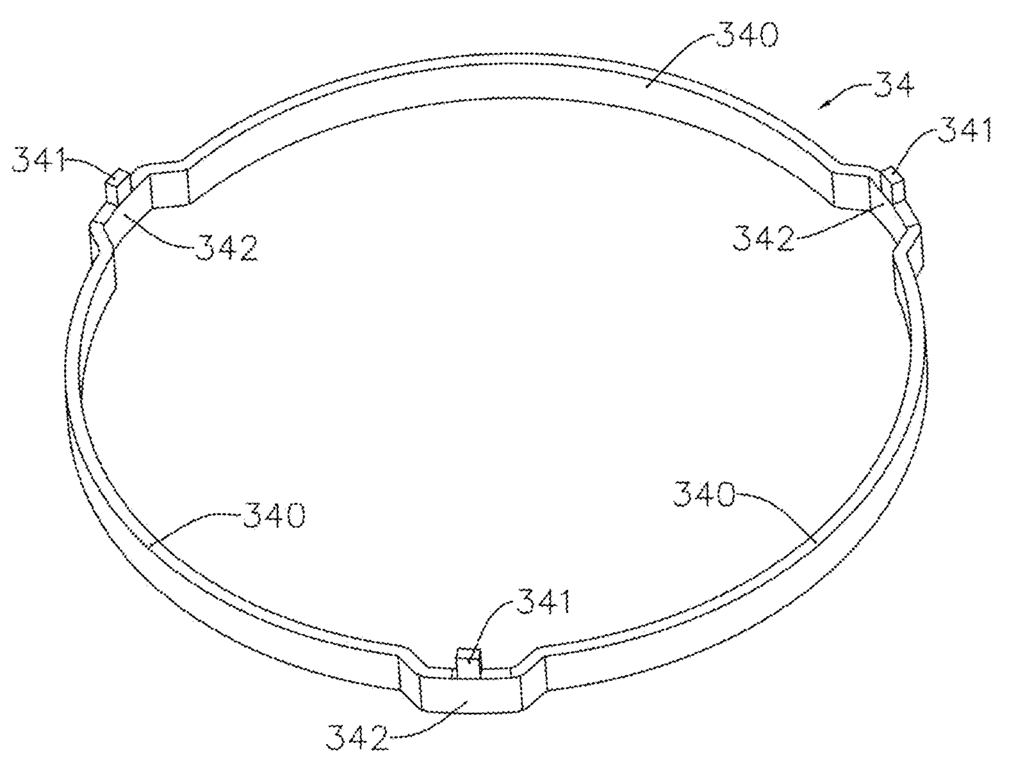
FIG. 5 is a structural diagram of a neutral connecting plate of Embodiment 2 of a stator assembly of the disclosure.

Besides adoption of the arc-shaped neutral connecting plate, a second neutral connecting plate 34 shown in FIG. 5 is also adopted, the second neutral connecting plate 34 in a closed ring shape includes a ring-shaped plate and a plurality of single-phase connecting groups, the ring-shaped plate is arranged in a closed ring shape, the plurality of single-phase connecting groups are uniformly distributed on the ring-shaped plate along a circumferential direction, the ring-shaped plate includes an second arc-shaped portion 340 and a second external protruding portion 342, and there are a plurality of second arc-shaped portions 340 and a plurality of second external protruding portions 342, the plurality of second arc-shaped portions 340 and the plurality of second external protruding portions 342 are connected end to end at intervals, an outer diameter of the second external protruding portion 342 is greater than that of the second arc-shaped portion 340, each single-phase connecting group is arranged on each second external protruding portion 342, the second external protruding portion 342 includes a plane section and connecting sections located on both sides of the plane section, and one connecting section is connected to the second arc-shaped portion 340 on the same side.

Each single-phase connecting group includes a second neutral connecting end 341, the second neutral connecting end 341 is arranged on the axial end surface of the plane section of the second external protruding portion 342 based on the axial direction of the ring-shaped plate, second neutral connecting ends 341 of the plurality of single-phase connecting groups are uniformly distributed along the circumferential direction and arranged at an included angle of 120°, and the second neutral connecting end 341 extends along the axial direction of the ring-shaped plate. Second neutral connecting ends 341, the arc-shaped portion and the external protruding portion in the ring-shaped plate are integrally formed.

The second neutral connecting end 341 is welded with the second star point end 314, the second arc-shaped portion 340 avoids the welding end of the winding wire, the second arc-shaped portion 340 of the second neutral connecting plate 34 is located on the radial inner side of the winding part 31, and then connection of star point ends of each phase is also able to be achieved.

Embodiment 3 of Stator Assembly

Figure 6:
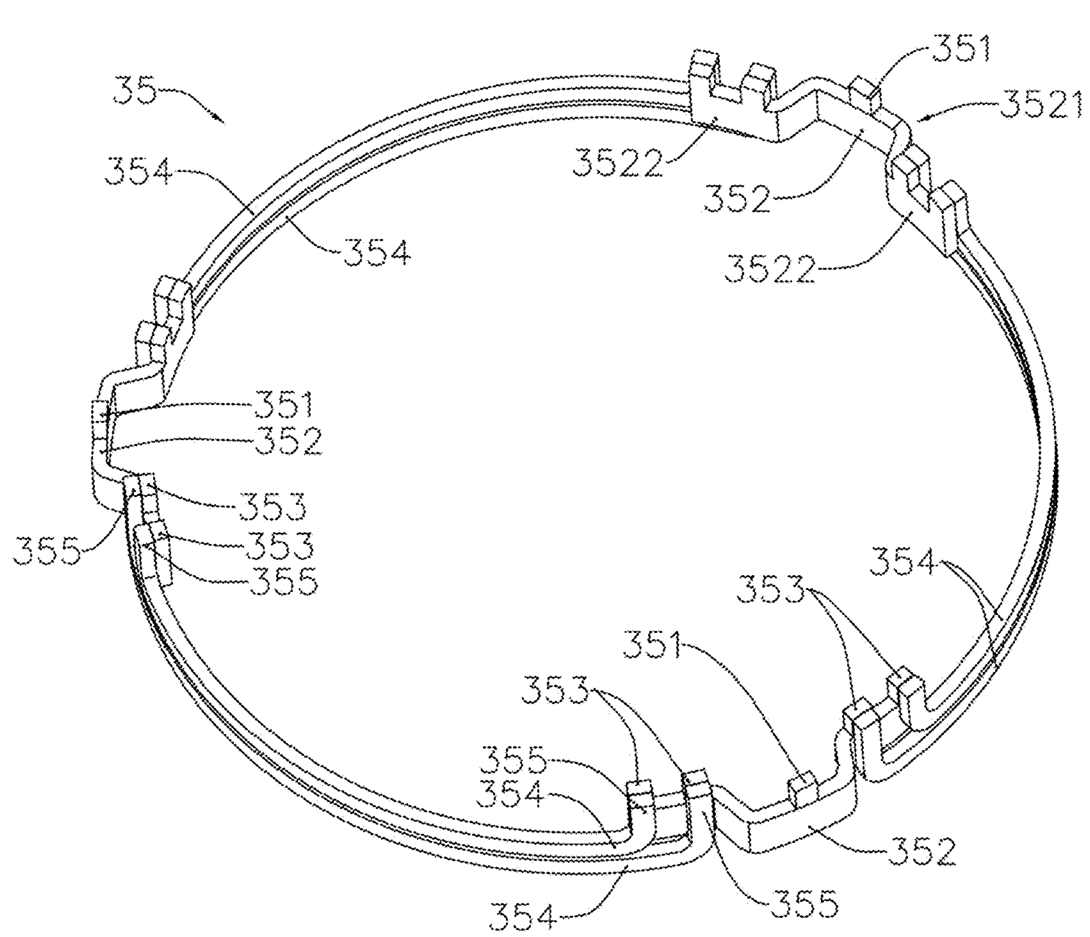
FIG. 6 is a structural diagram of a neutral connecting plate of Embodiment 3 of a stator assembly of the disclosure.

Besides adoption of the above neutral connecting plate, a third neutral connecting plate 35 shown in FIG. 6 is also adopted, the split third neutral connecting plate 35 includes an arc-shaped plate 354 and a single-phase connector 352, and there are six arc-shaped plates 354 and three single-phase connectors 352, the single-phase connector 352 includes a third external protruding portion 3521 and an inner connecting portions 3522, and there are two inner connecting portions 3522, the two inner connecting portions 3522 are located on two sides of the external protruding portion 3521, a third neutral connecting end 351 is arranged on an axial end surface of the third external protruding portion 3521 based on an axial direction of the arc-shaped plate 354, two first end connecting ends 353 are arranged on an axial end surface of one inner connecting part 3522 based on the axial direction of the arc-shaped plate 354 and are distributed along the circumferential direction, and the third external protruding portion, the two inner connecting portions, the third neutral connecting end and the two first end connecting end are integrally formed.

The six arc-shaped plates 354 are arranged in a concentric arc extension manner, a second end connecting end 355 is provided at ends of the arc-shaped plate 354 and is distributed along the circumferential direction, the third neutral connecting end 351, the first end connecting end 353 and the second end connecting end 355 are arranged in an axial extension manner, the inner connecting part 3522 is located on a radial inner side of the second end connecting end 355, the first end connecting end 353 and the second end connecting end 355 are distributed along the radial direction of the arc-shaped plate 354, the first end connecting end 353 is located on an inner side of the second end connecting end 355, each first end connecting end 353 is welded with each second end connecting end 355, then two arc-shaped plates 354 are connected on the same side of the single-phase connector 352, and the two arc-shaped plates 354 on the same side are distributed along the axial direction.

Then the arc-shaped plates 354 and single-phase connectors 352 are connected end to end at intervals to form the third neutral connecting plate 35 in a closed ring-shape, based on a circle center of the arc-shaped plate 354, a distance between the third neutral connecting end 351 and the circle center is greater than an outer diameter of the arc-shaped plate 354.

Of course, a user is also able to adjust and organically combine the numbers of the arc-shaped plate 354 and the single-phase connector 352 according to requirements, the single-phase connector is also able to be connected on single side, that is, two arc-shaped plates and at least three single-phase connectors are adopted to form the neutral connecting plate in arc-shaped extension, meanwhile, an extension arc of the arc-shaped plate is also able to be adjusted, and then a connection combination manner of six single-phase connectors is formed.

The third neutral connecting end 351 is welded with the second star point end 314, the arc-shaped plate 354 avoids the welding end of the winding wire, the arc-shaped plate 354 of the third neutral connecting plate 35 is located on the radial inner side of the winding part 31, and then connection of star point ends of each phase is also able to be achieved.

Embodiment 4 of Stator Assembly

Figure 7:
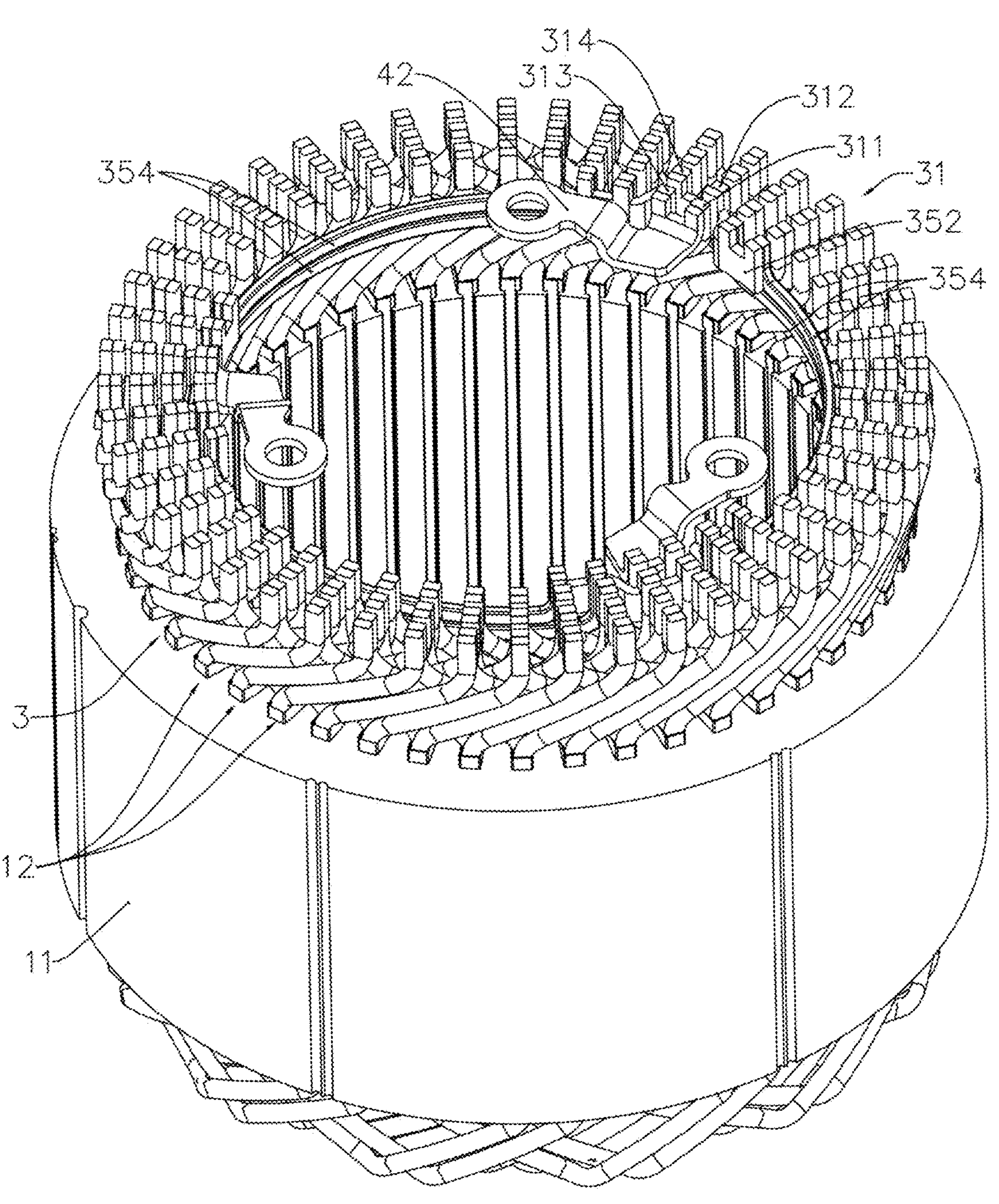
FIG. 7 is a structural diagram of Embodiment 4 of a stator assembly of the disclosure.
Figure 8:
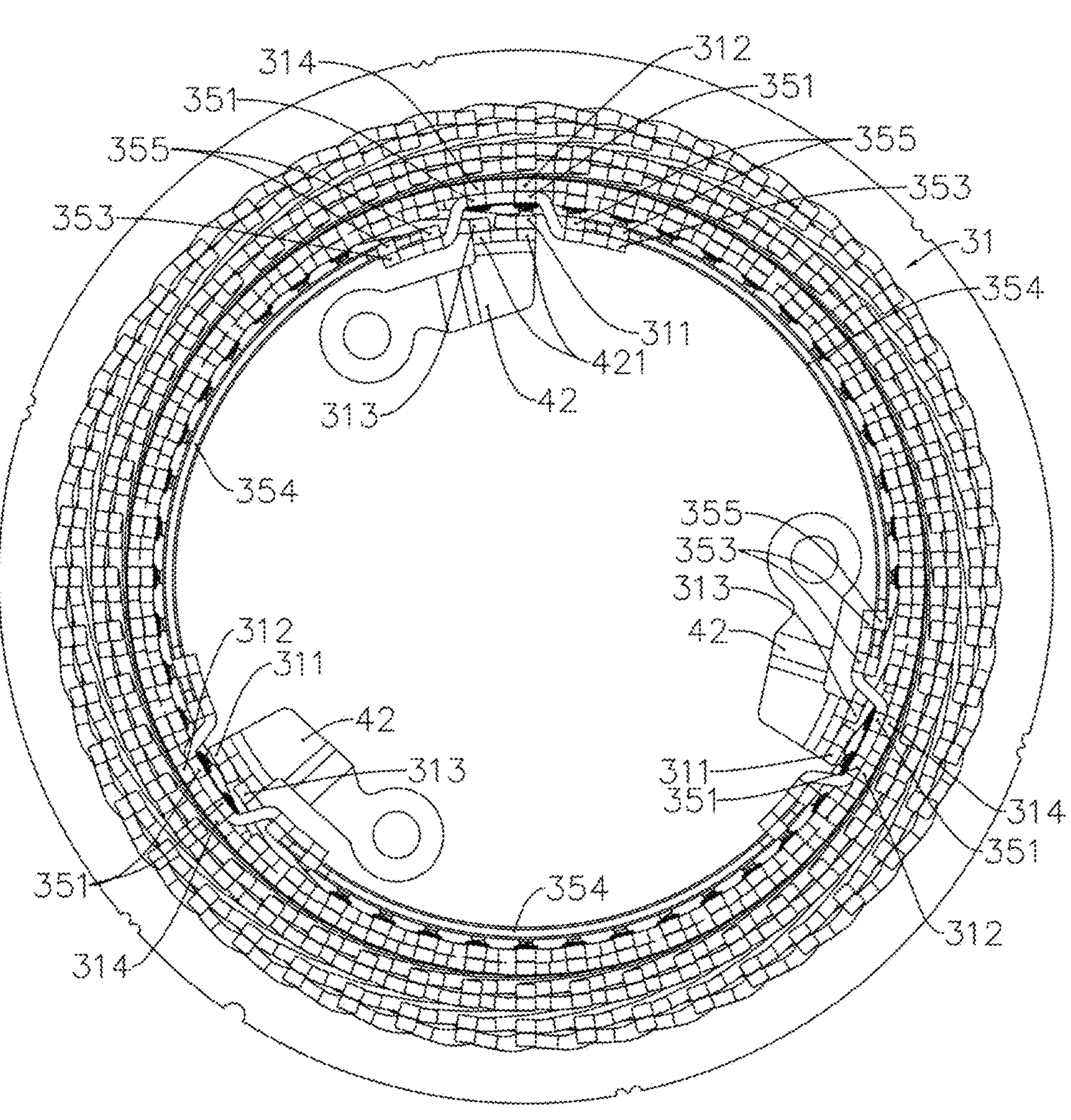
FIG. 8 is a structural diagram on an axial side of Embodiment 4 of a stator assembly of the disclosure.
Figure 9:
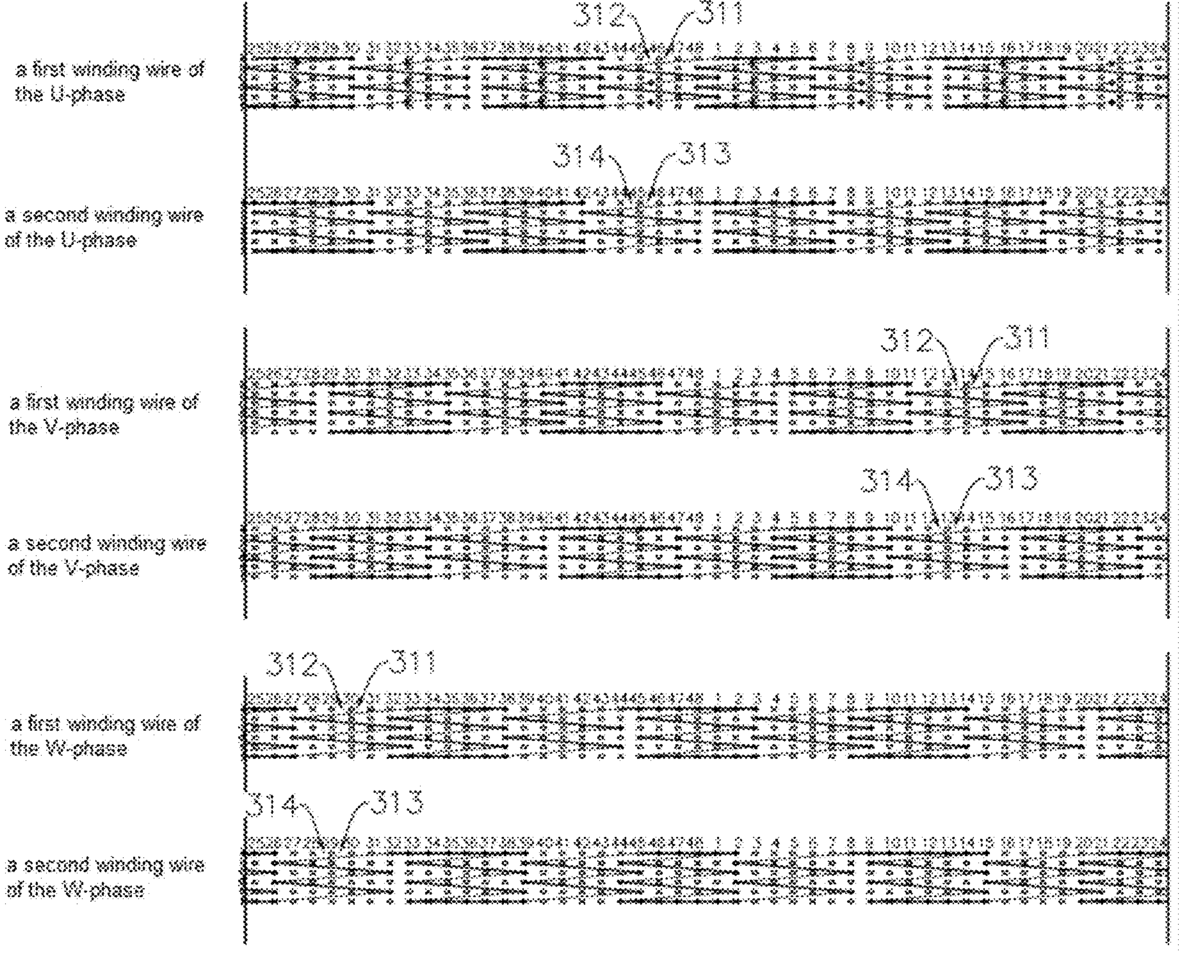
FIG. 9 is a schematic diagram of a winding of Embodiment 4 of a stator assembly of the disclosure.

Referring to FIGS. 7-9, a stator assembly includes a stator core 11 and a stator winding 3, the stator core 11 is provided with a plurality of stator slots 12, the plurality of stator slots 12 are distributed along the circumferential direction of the stator core 11, in the embodiment, the number of the plurality of stator slots is 48, the number of phases is three, the three phases include a U-phase, a V-phase, and a W-phase, each of the plurality of stator slots 12 is provided with a plurality of slot layers, the plurality of slot layers are distributed along the radial direction of the stator core 11, the plurality of slot layers are respectively an a-th layer, a b-th layer, a c-th layer, a d-th layer, an e-th layer, and a f-th layer from inside to outside along the radial direction, and the above stator parameter variations are able to be set according to specific motor application.

The stator winding 3 includes a U-phase winding, a V-phase winding and a W-phase winding, in the embodiment, a flat wire is utilized and a wave winding manner is adopted for arrangement, the flat wire is inserted into a corresponding slot layer of a stator slot, a starting point of the winding wire is from an innermost layer to an outermost layer in a clockwise winding manner, then from the outermost layer to the innermost layer, to the tail end, from the innermost layer to the outermost layer in an anticlockwise winding manner through an adapter, then from the outermost layer to the innermost layer, after the end of each flat wire deflects, the axial two ends are welded, and finally, the star point ends of each phase are welded together through a neutral wire.

Specifically, each phase of winding is arranged in parallel in two winding wires, a first winding wire and a second winding wire of the same phase are distributed in parallel, the U-phase is taken as an example, the first winding wire of the U-phase and the second winding wire of the U-phase are connected in parallel, the first leading-out end 311 of the first winding wire of the U-phase is led out from the innermost slot layer (the a-th layer) of the 1st slot, the second leading-out end 313 of the second winding wire of the U-phase is led out from the innermost slot layer (the a-th layer) of the 48th slot, winding arrangement is carried out according to a winding schematic diagram shown in FIG. 9, a thick line in the figure is a wire inserting end, a thin line is a welding end, after the two winding wires of the U-phase are respectively arranged for one circle, the first star point end 312 of the first winding wire of the U-phase is led out from the secondary innermost slot layer (the b-th layer) of the 43th slot, and the second star point end 314 of the second winding wire of the U-phase is led out from the secondary innermost slot layer (the b-th layer) of the 42nd slot.

Along with deflection of the end of the winding wire, the first leading-out end 311 and the first star point end 312 deflect to a position opposite the 46th slot, and the second leading-out end 313 and the second star point end 314 deflect to a position opposite the 45th slot.

The V-phase winding and the W-phase winding are both the same as the U-phase in winding, connecting manner and leading-out manner, specifically, arrangement is able to be carried out referring to a winding schematic diagram shown in FIG. 9, the first leading-out end 311 of the first winding wire of the V-phase is led out from the a-th layer of the 17th slot, the first star point end 312 of the first winding wire of the V-phase is led out from the b-th layer of the 11th slot, the second leading-out end 313 of the second winding wire of the V-phase is led out from the a-th layer of the 16th slot, the second star point end 314 of the second winding wire of the V-phase is led out from the b-th layer of the 10th slot, the first leading-out end 311 of the first winding wire of the W-phase is led out from the a-th layer of the 33th slot, the first star point end 312 of the first winding wire of the W-phase is led out from the b-th layer of the 27th slot, the second leading-out end 313 of the second winding wire of the W-phase is led out from the a-th layer of the 32nd slot, the second star point end 314 of the second winding wire of the W-phase is led out from the b-th layer of the 26th slot, and the first star point end 312 and the second star point end 314 of each phase are connected to form a star connection method.

The first leading-out end 311, the first star point end 312, the second leading-out end 313 and the second star point end 314 of one winding wire of each phase are located on the radial inner side of the winding part 31 based on the stator core 11, leading-out ends of two winding wires of each phase are uniformly distributed along the circumferential direction of the stator core 11, star point ends of two winding wires of each phase are uniformly distributed along the circumferential direction of the stator core 11, more specifically, in the axial projection of the stator core 11, the projection of the first leading-out end 311 is located on the radial inner side of the projection of the first star point end 312 based on the stator core 11, and the projection of the second leading-out end 313 is located on the radial inner side of the projection of the second star point end 314 based on the stator core 11.

The first leading-out end 311 of the first winding wire of the U-phase, the first leading-out end 311 of the first winding wire of the V-phase and the first leading-out end 311 of the first winding wire of the W-phase are circumferentially and uniformly distributed with an included angle of 120°, the second leading-out end 313 of the second winding wire of the U-phase, the second leading-out end 313 of the second winding wire of the V-phase and the second leading-out end 313 of the second winding wire of the W-phase are circumferentially and uniformly distributed with an included angle of 120°, the second star point end 314 of the first winding wire of the U-phase, the second star point end 314 of the first winding wire of the V-phase and the second star point end 314 of the first winding wire of the W-phase are circumferentially and uniformly distributed with an included angle of 120°, and the second star point end 314 of the second winding wire of the U-phase, the second star point end 314 of the second winding wire of the V-phase and the second star point end 314 of the second winding wire of the W-phase are circumferentially and uniformly distributed with an included angle of 120°.

Figure 10:
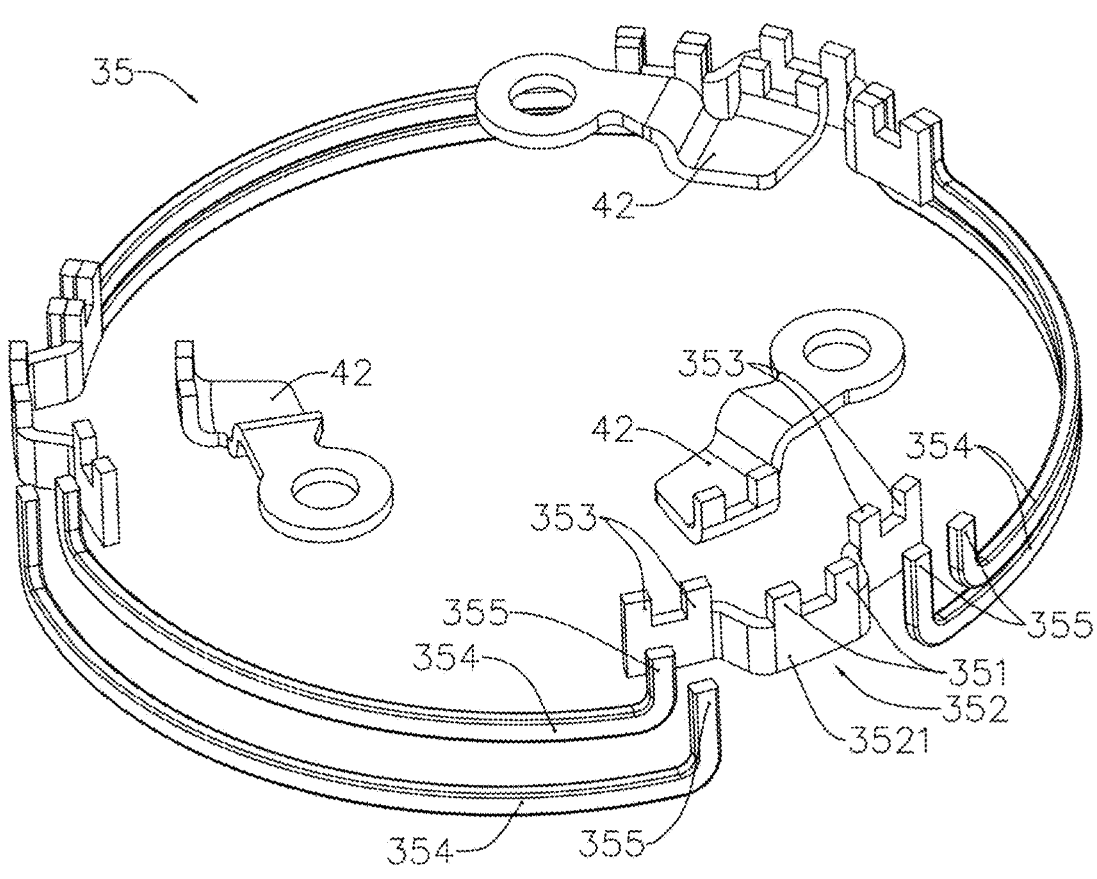
FIG. 10 is a structural diagram of a neutral connecting plate of Embodiment 4 of a stator assembly of the disclosure.

Referring to FIG. 10 and combining with FIG. 8, the stator assembly further includes a third neutral connecting plate 35, the third neutral connecting plate 35 adopts the split neutral connecting plate as shown in FIG. 6, each phase has two star point ends of two winding wires, therefore, in the embodiment, two third neutral connecting ends 351 are arranged on the second external protruding portion 3521 of the single-phase connector 352, the two third neutral connecting ends 351 are respectively located on two sides, the two third neutral connecting ends 351 of the third external protruding portion 3521 extends to the outer side of the second leading-out end 313 and are respectively welded with the first star point end 312 and the second star point end 314, and the six third neutral connecting ends 351 of the third neutral connecting plate 35 are respectively connected to star point ends of the U-phase, the V-phase and the W-phase, thus achieving the star connecting method. In addition, the third external protruding portion 3521 of the single-phase connector 352 is located between the star point end and the leading-out end of the same winding wire, the arc-shaped plate 354 avoids the welding end of the winding wire, the arc-shaped plate 354 of the third neutral connecting plate 35 is located on the radial inner side of the winding part 31.

Figure 11:
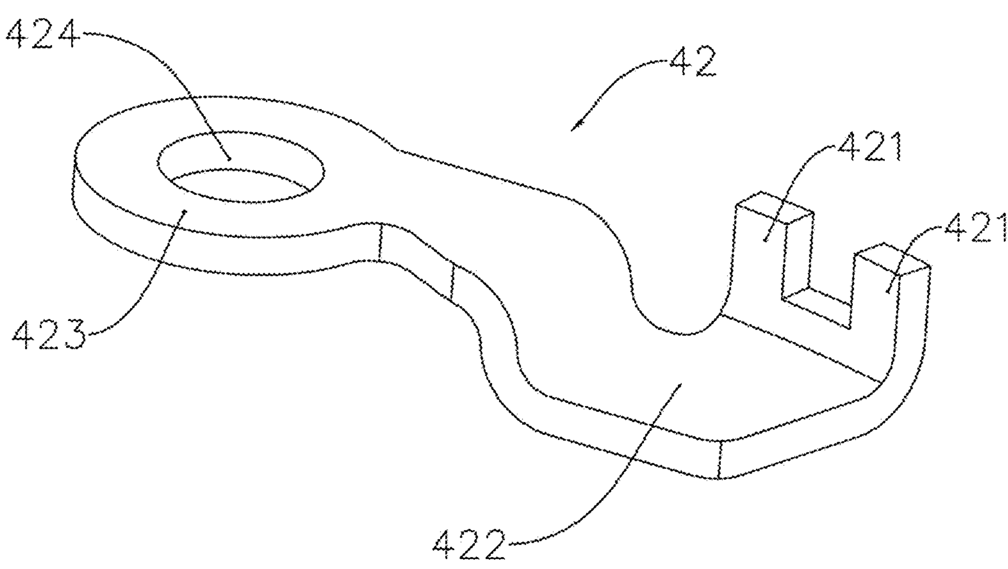
FIG. 11 is a structural diagram of a single-phase terminal of Embodiment 4 of a stator assembly of the disclosure.

Referring to FIG. 11 and combining with FIG. 8, the stator assembly further includes a second single-phase terminal 42, and there are three second single-phase terminals 42, the three second single-phase terminals 42 are located on the radial inner side of the winding part 31 and are distributed uniformly along the circumferential direction, the second single-phase terminal 42 includes a wiring board 423 and an access board 422, two adjacent second access ends 421 are arranged on the access board 422, extension directions of the two second access ends 421 are vertical to that the access board 422, an extension direction of the access board 422 is parallel to that of the wiring board 423, after the second single-phase terminal 42 is connected to the first leading-out end 311, two second access ends 421 and the first leading-out end 311 extend in the same direction and extend along the axial direction, heights of the two second access ends 421 are the same, the wiring board 423 and the access board 422 are connected in a misaligned manner, the second access ends 421 and the wiring board 423 are located on both sides of the access board 422, the two second access ends 421 are located on the same side part along the extension direction of the wiring board 423, the wiring board 423 is raised close to the second access ends 421, the wiring board 423 is also raised close to an axial outer end, the access board 422 is concave towards an axial inner side, and the wiring board 423, the access board 422 and the two second access ends 421 are integrally formed.

A wiring hole 424 is arranged in the wiring board 423 in a penetrating manner, the wiring board 423 and the wiring hole 424 are close to the arc-shaped plate 354 of the neutral connecting plate, and the wiring board 423 is located on the radial inner side of the neutral connecting plate. Each second access end 421 of the second single-phase terminal 42 is welded with the first leading-out end 311 and the second leading-out end 313 respectively, and the wiring holes 424 of the three second single-phase terminals 42 are respectively connected to terminals of the U, V and W phases in the motor controller correspondingly, and then power output and control are able to be achieved.

Figure 1:
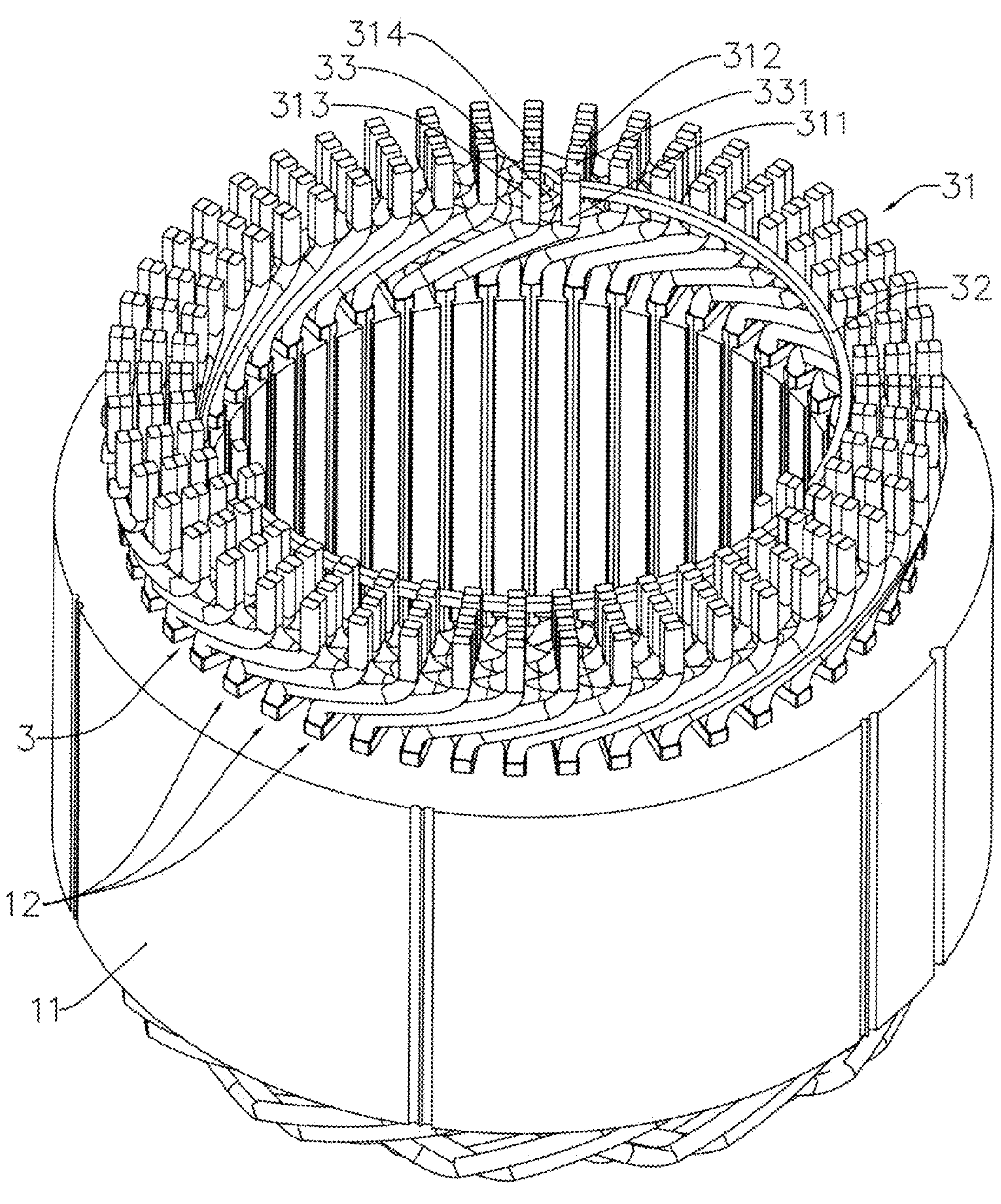
FIG. 1 is a structural diagram of Embodiment 1 of a stator assembly of the disclosure.
Figure 2:
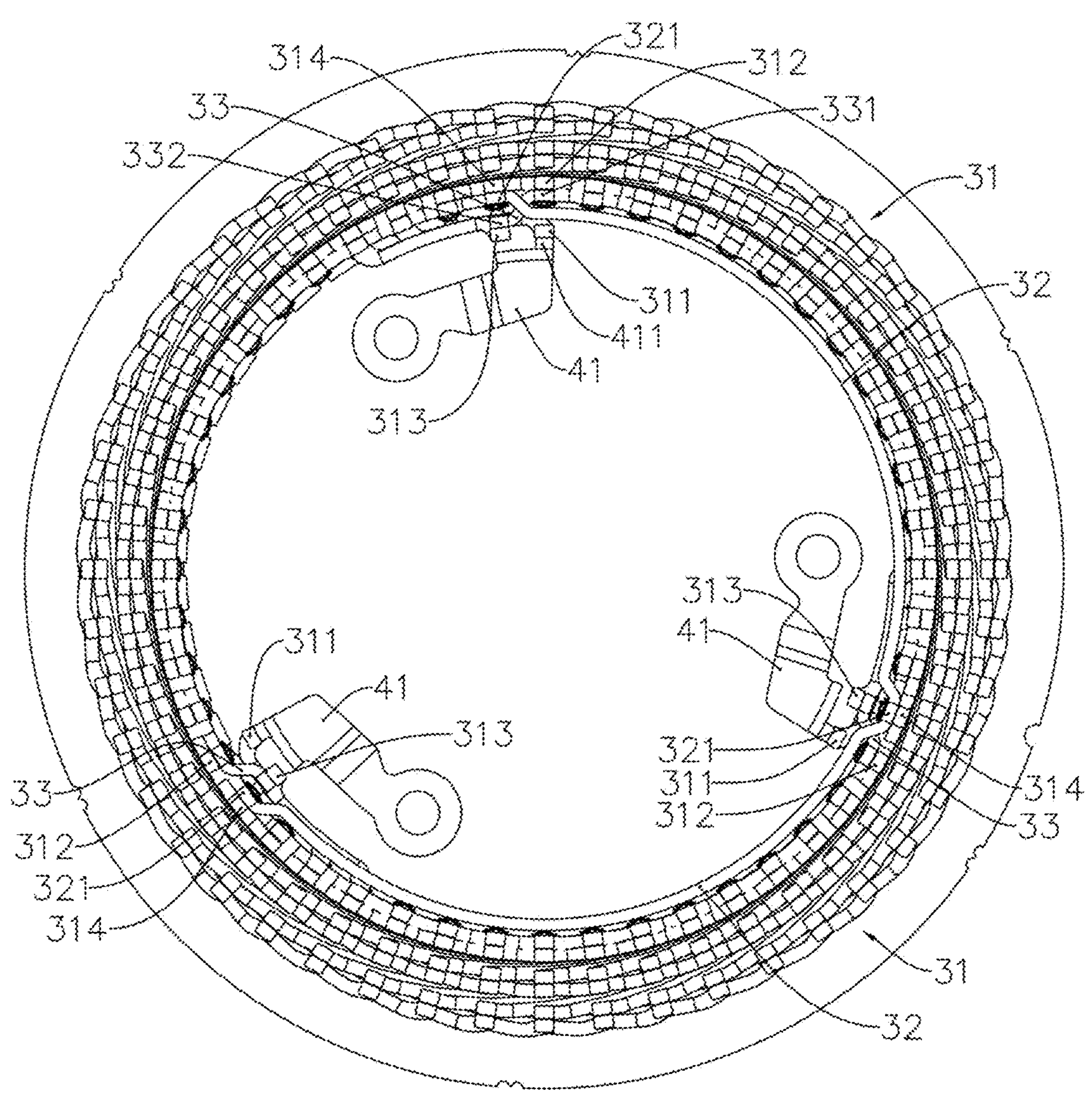
FIG. 2 is a structural diagram on an axial side of Embodiment 1 of a stator assembly of the disclosure.

In addition, based on a basic structure of the second single-phase terminal 42, the second single-phase terminal 42 is a first single-phase terminal 41 after one second access end 421 is saved, referring to FIG. 2, the three first single-phase terminals 41 are located on the radial inner side of the winding part 31 and distributed uniformly along the circumferential direction, and are located on the radial inner side of the first neutral connecting plate 32, the first single-phase terminal 41 is provided with a first access end 411, the first access end 411 is connected to the first leading-out end 311, and meanwhile, the first single-phase terminal 41 is connected to the terminals of the U, V and W phases in the motor controller, then power output and control are able to be achieved.

Figure 12:
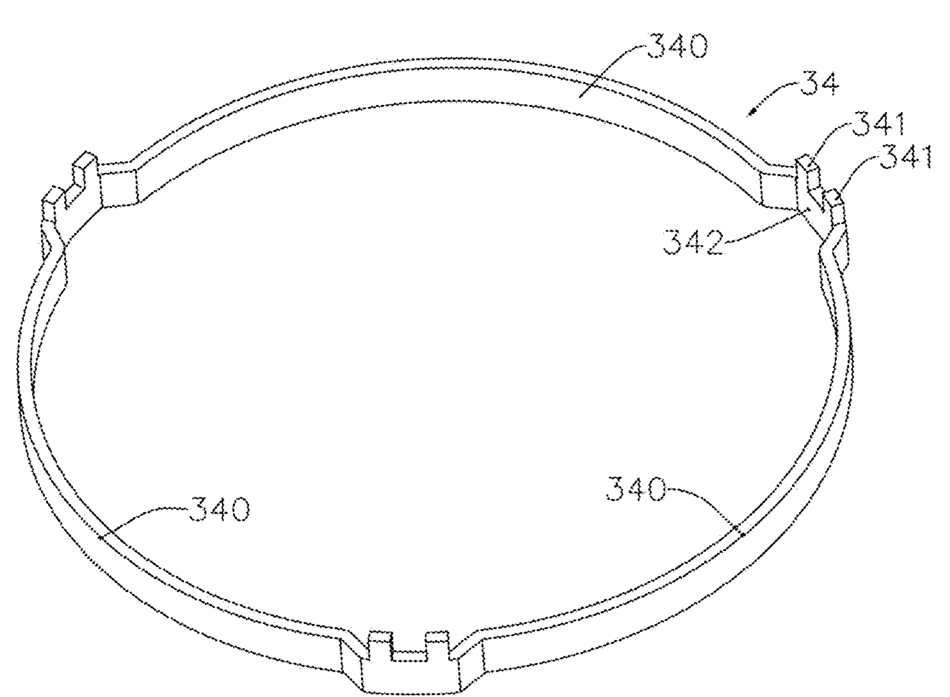
FIG. 12 is a structural diagram of a neutral connecting plate of Embodiment 5 of a stator assembly of the disclosure.

Referring to FIG. 12, for the neutral connecting plate, the second neutral connecting plate 34 shown in FIG. 5 is able to be adopted, the single-phase connecting group includes two second neutral connecting ends 341, each second neutral connecting end 341 is arranged on the axial end surface of the plane section of the second external protruding portion 342 based on the ring-shaped plate, the two second neutral connecting ends 341 are distributed on two sides, the plurality of second neutral connecting ends 341 on the same side are uniformly distributed along the circumferential direction and arranged at an included angle of 120°, and the plurality of second neutral connecting ends 341 are respectively welded with the first star point end 312 and the second star point end 314 to achieve a star connection method.

Figure 4:
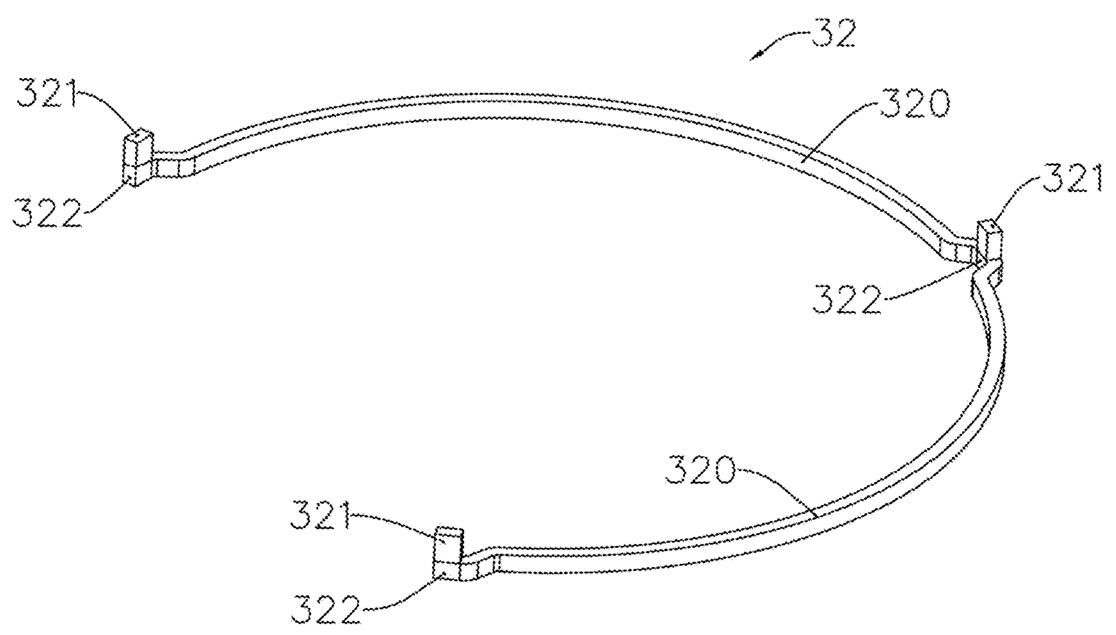
FIG. 4 is a structural diagram of a neutral connecting plate of Embodiment 1 of a stator assembly of the disclosure.
Figure 13:
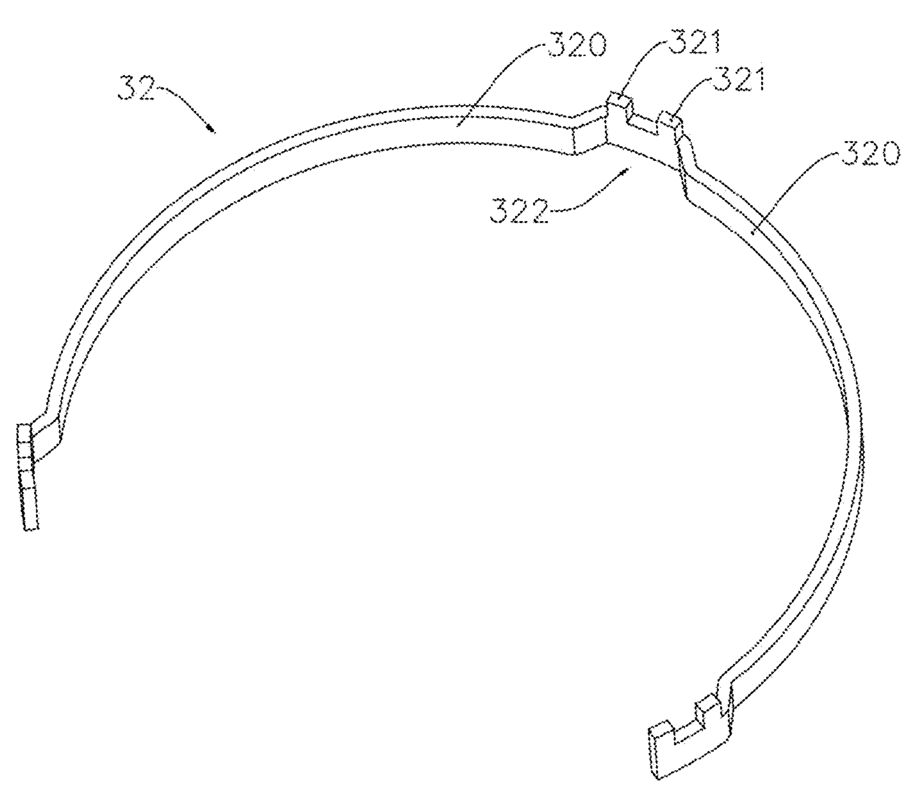
FIG. 13 is a structural diagram of a neutral connecting plate of Embodiment 6 of a stator assembly of the disclosure.

Referring to FIG. 13, for the neutral connecting plate, the first neutral connecting plate 32 shown in FIG. 4 is able to be adopted, the single-phase connecting group includes two first neutral connecting ends 321, the two first neutral connecting ends 321 are arranged on the axial end surface of the first external protruding portion 322 and are distributed on two sides, the plurality of first neutral connecting ends 321 on the same side are uniformly distributed along the circumferential direction and arranged at an included angle of 120°, and the plurality of first neutral connecting ends 321 are respectively welded with the first star point end 312 and the second star point end 314 to achieve a star connection method.

Embodiment 5 of Stator Assembly

Figure 14:
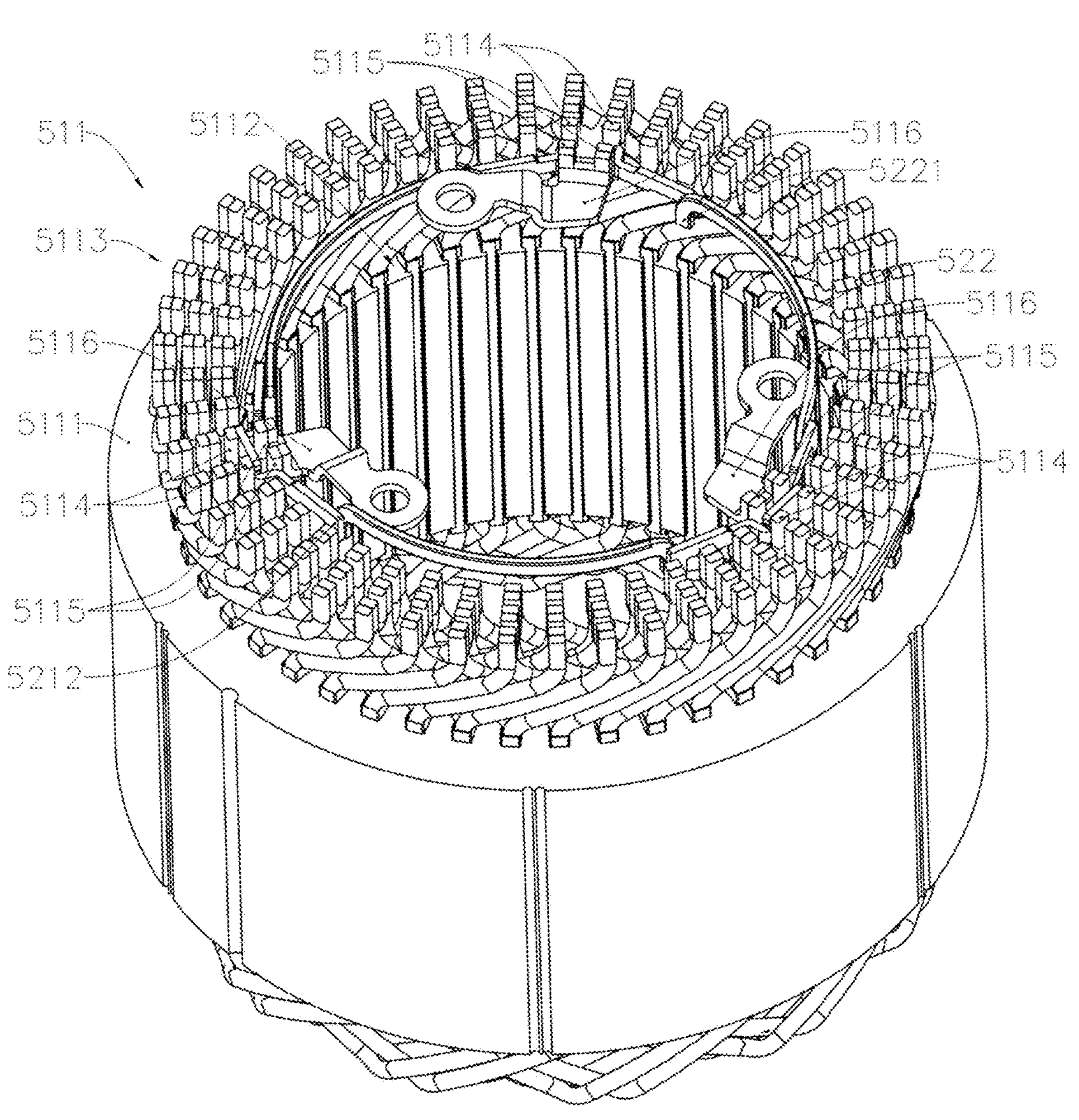
FIG. 14 is a structural diagram of an embodiment of a stator assembly of the disclosure.
Figure 15:
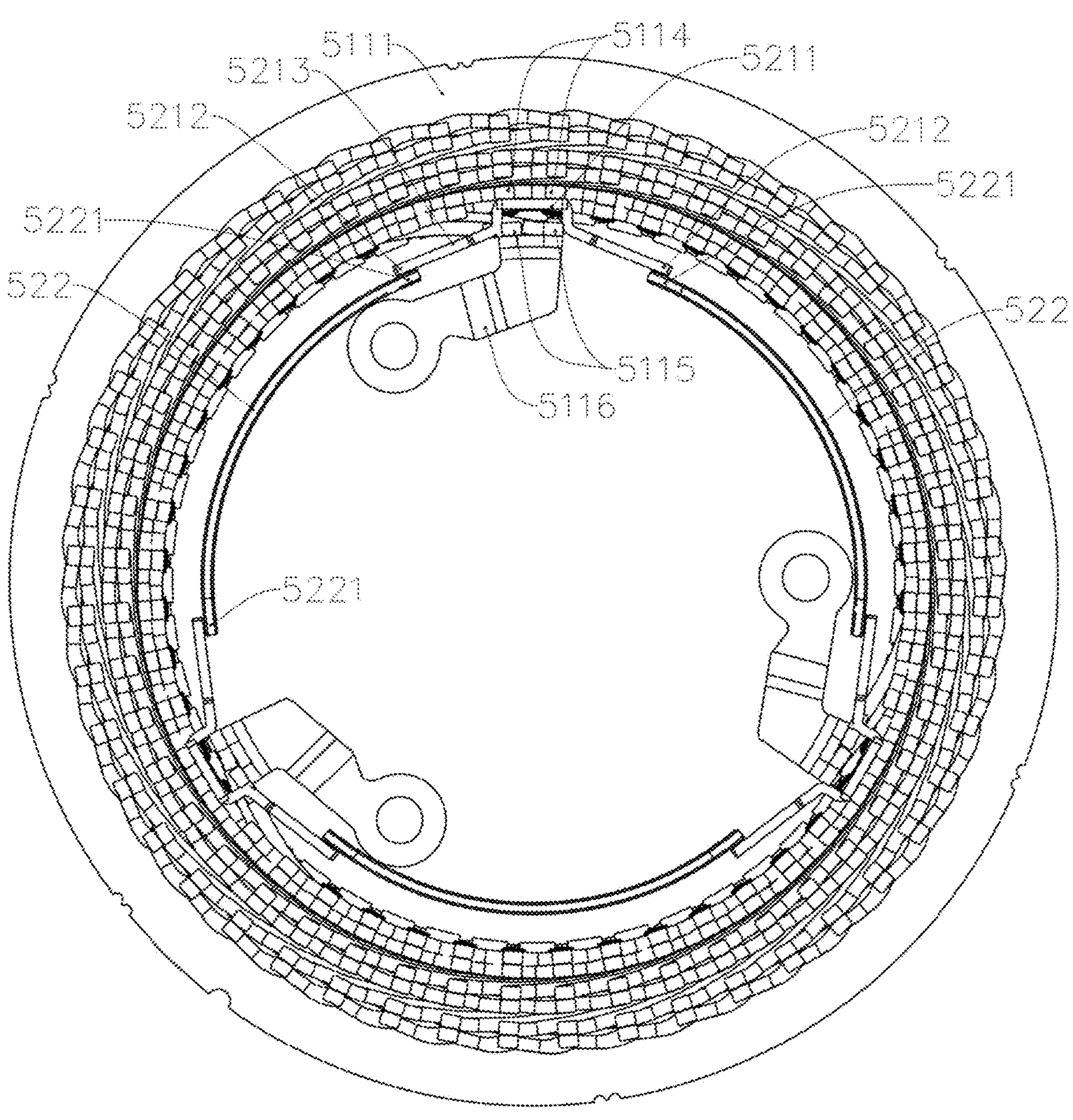
FIG. 15 is a structural diagram on an axial side of an embodiment of a stator assembly of the disclosure.
Figure 16:
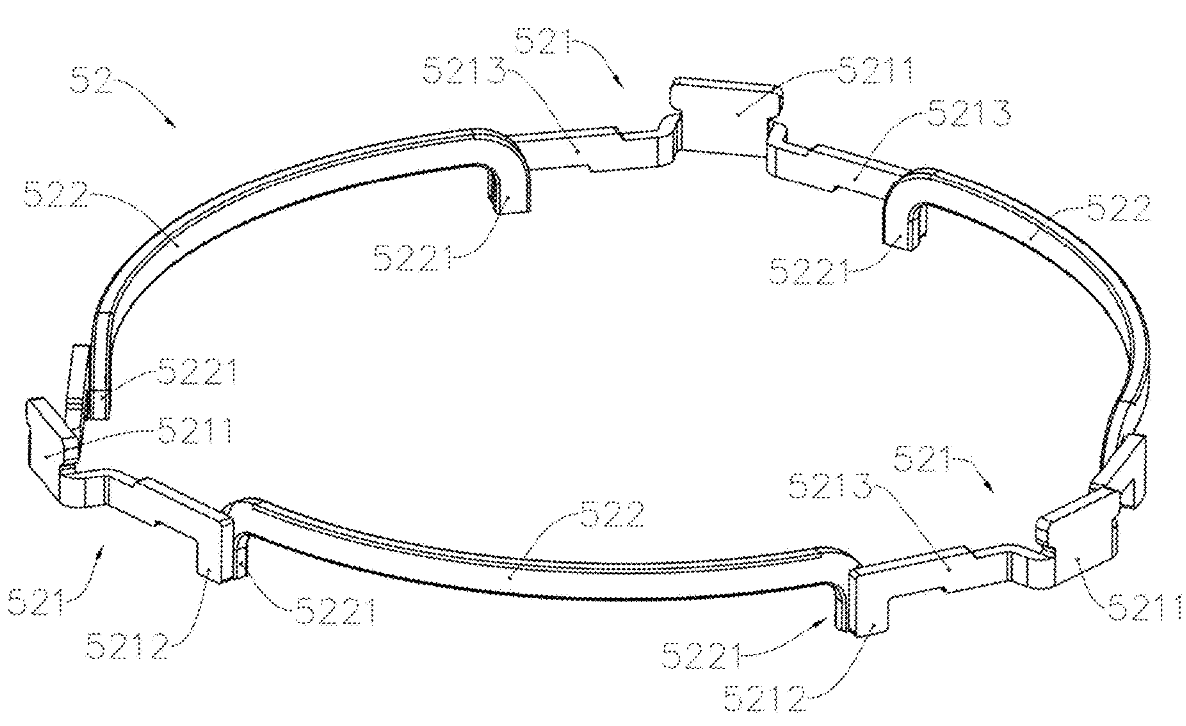
FIG. 16 is a structural diagram of a neutral connecting assembly of an embodiment of a stator assembly of the disclosure.

Referring to FIGS. 14-16, a stator assembly 511 includes a stator core 5111, a stator winding and a neutral connecting assembly 52, the stator core 5111 is provided with a plurality of stator slots 5112, the plurality of stator slots 5112 are distributed along the circumferential direction of the stator core 5111, each of the plurality of stator slots 5112 is provided with a plurality of slot layers, the plurality of slot layers are distributed along the radial direction of the stator core 5111, and the numbers of the stator slots and the slot layers and stator relevant parameters are able to set according to specific motor application.

The stator winding includes a U-phase winding, a V-phase winding and a W-phase winding, in the embodiment, a flat wire is utilized and a wave winding manner is adopted for arrangement, the flat wire is inserted into a corresponding slot layer of a stator slot, the starting point of the winding wire is from the innermost layer to the outermost layer in a clockwise winding manner, then from the outermost layer to the innermost layer, to the tail end, from the innermost layer to the outermost layer in an anticlockwise winding manner through an adapter, then from the outermost layer to the innermost layer, after the end of each flat wire deflects, the axial two ends are welded, and finally, the star point ends of each phase are welded together through a neutral wire. The specific winding method refers to the stator assembly disclosed in Chinese Patent No. CN114204725A.

Specifically, the winding part 5113 of two winding wires of each phase of the stator winding is arranged in the plurality of stator slots 5112, each phase of winding is arranged in parallel in two winding wires, a first winding wire and a second winding wire of the same phase are distributed in parallel, leading-out ends 5115 of the two winding wires of each phase are all located on the radial inner side of the winding part 5113 based on the stator core 5111, the leading-out ends 5115 of the two winding wires of each phase are respectively led out from the innermost slot layers of the plurality of slot layers of two adjacent stator slots 5112 of the plurality of stator slots 5112, the leading-out ends 5115 of the first winding wire of each phase are uniformly distributed along the circumferential direction of the stator core 5111, and the leading-out ends 5115 of the second winding wires of each phase are uniformly distributed along the circumferential direction of the stator core 5111, the leading-out ends 5115 are connected to a terminal 5116, and the terminal 5116 is configured for being connected to a three-phase output wire in the motor controller.

Star point ends 5114 of the two winding wires of each phase are all located on the radial inner side of the winding part 5113 based on the stator core 5111, the star point ends 5114 of the two winding wires of each phase are all led out from the secondary innermost slot layers of the plurality of slot layers of two adjacent stator slots 5112 of the plurality of stator slots 5112, the star point ends 5114 of the first winding wire of each phase are uniformly distributed along the circumferential direction of the stator core 5111, and the star point ends 5114 of the second winding wire of each phase are uniformly distributed along the circumferential direction of the stator core 5111. Both the leading-out ends 5115 and the star point ends 5114 are led out towards the axial outer side of the stator core 5111, in the axial projection of the stator core 5111, the projection of the leading-out end 5115 is located on the radial inner side of the projection of the star point end 5114 based on the stator core 5111.

The star point ends of the three phases are connected through a neural connecting assembly 52, the neural connecting assembly 52 includes a star point connecting plate 521 and an arc-shaped connecting plate 522, and there are three star point connecting plates 521 and three arc-shaped connecting plates 522, both the star point connecting plate 521 and the arc-shaped connecting plate 522 are formed by integrated stamping, a welding flat plate 5211 is provided in a middle of the star point connecting plate 521, a connecting arm 5213 is provided on each of two sides of the welding flat plate 5211, a fixing end of the connecting arm 5213 is close to the axial inner side of the stator core 5111 and is connected to the welding flat plate 5211, a first connecting end 5212 is provided at a free end of the connecting arm 5213, so that the first connecting end 5212 is respectively located on each of two sides of the welding flat plate 5211. The arc-shaped connecting plate 522 extends in an arc shape, a second connecting end 5221 is provided at each of two ends of the arc-shaped connecting plate 522, the star point connecting plate 521 and the arc-shaped connecting plate 522 are connected in sequence at intervals, one first connecting end 5212 is welded with one second connecting end 5221, the first connecting end 5212 and the second connecting end 5221 are located on the axial inner side of the star point ends 5114 based on the stator core 5111, both the first connecting end 5212 and the second connecting end 5221 are led out towards the axial inner side of the stator core 5111, namely, the first connecting end 5212 and the second connecting end 5221 are led out towards the opposite direction of the star point ends 5114.

The welding flat plate 5211 is located between the leading-out ends 5115 and the star point ends 5114, the welding flat plate is connected to two star point ends 5114 of each phase, the connecting arm 5213 extends out towards the radial inner side, so that the second connecting end 5221 is located on the radial inner side of the first connecting end 5212 based on the stator core 5111, both the second connecting end 5221 and the arc-shaped connecting plate 522 are located on the radial inner side of the winding part 5113, and thus connection of a plurality of star point ends 5114 is achieved.

Embodiment of Motor

The motor includes a rotor assembly, and the stator assembly in the above embodiment, the rotor assembly is rotatably arranged in the stator core, and the rotor assembly includes a rotor and a magnet arranged on the rotor.

Embodiment of Powertrain

The powertrain includes a motor and a motor control apparatus, the motor includes a rotor assembly and the stator assembly in the above embodiment, the motor control apparatus is able to adopt a three-phase wiring holder and a motor control apparatus disclosed in platent No. CN110912326A "Three-Phase Wiring Holder, Driving Assembly and Vehicle", the motor control apparatus is connected at the axial end of the motor, the three-phase wiring holder is arranged in the middle of the motor control apparatus, the three-phase wiring holder of the motor control apparatus is provided with at least three single-phase terminals in the middle, the at least three single-phase terminals are uniformly distributed along the circumferential direction, and the leading-out end is connected to the single-phase terminal.

Embodiment of Vehicle

A vehicle includes the driving assembly in the above embodiment, the driving assembly is able to be integrated with or without a transmission, and the vehicle is able to be a new energy electric car, a new energy electric coach, a new energy electric truck, a new energy electric cleaning vehicle, a new energy electric rail vehicle, a new energy electric flying vehicle, a new energy electric shipping vehicles and the like.

Of course, the above embodiments are only specific embodiments of the disclosure, in specific application, the star point ends are able to be uniformly arranged on the radial outer side of the winding along the circumferential direction, then the star point ends are connected through the neutral connecting plate on the outer side, the match of the leading-out end is able to be configured according to the number of phase and the number of path of the winding, the included angle between the leading-out ends is able to be 120°, 60°, 45°, 30° or other angles in uniform distribution, in addition, the neutral connecting plate is able to be arranged in a ring shape and an arc shape as a whole, namely, the convex design is not adopted, the protruding of the neutral connecting plate and connection to the star point ends are able to be utilized, in addition, the outgoing positions of the leading-out end of each phase and the star point end of each phase are uniformly distributed along the circumferential direction correspondingly, meanwhile, the leading-out end of each phase and the star point end of each phase are bent by the same amplitude after leading-out, the ends are also correspondingly distributed along the circumferential diction, both the outgoing position and the end position are distributed along the circumferential direction, the winding manner, the number of circle and the number of layer is able to be adjusted according to practical application, the stator wind is also able to adopt a round copper wire or be arranged, all the above changes are able to achieve the purpose of the disclosure, which are also within the scope of protection of the disclosure.

Therefore, the leading-out ends are arranged on the radial inner side of the winding part and uniformly distributed along the circumferential direction, the star point ends are able to be distributed on the outer side or inner side and a star connection method or a delta connection method are able to be adopted according to requirements, then the resistance of each phase adopt be balanced, the current in each phase adopt be balanced, thus the operation stability and related performance of the motor are improved, meanwhile, the axial space and radial inner space of the motor are fully utilized, the end height and radial arrangement space of the motor winding are reduced as a whole, which is beneficial for reducing use of the volume of the motor of the stator assembly.

In addition, the leading-out ends of two winding wires connected in parallel of each phase are all located on the radial inner side of the winding part and the leading-out ends of the corresponding paths of each phase are uniformly distributed along the circumferential direction, the star point end may be distributed on the outer side or inner side and a star connection method or a delta connection method are able to be adopted according to requirements, then the resistance of each phase is able to be balanced, the current in each phase is able to be balanced, and thus the operation stability and related performance of the motor are improved.

Moreover, the star point ends are arranged on the radial inner side of the winding part and uniformly distributed along the circumferential direction, in match with connection of the neutral connecting ends uniformly distributed in the circumferential direction and the star point ends, the resistance of each phase is able to be balanced, the current in each phase is able to be balanced, meanwhile, the single-phase connecting group is arranged on the axial end surface of the external protruding portion, the arc-shaped portion is arranged with a small outer diameter, the external protruding portion is configured for convex connection with the star point end, while the arc-shaped portion on the inner side may avoid the arrangement structure of the winding, so that the gap of each part is uniform, in addition, the space of the end of the winding is able to be saved, the neutral connecting end extending in the axial direction is in the same direction as the star point end, so that the welding connection process at the end is facilitated. Meanwhile, a partition part is available between the single-phase connecting groups on two ends, so that it is easier to process the disconnected arc-shaped, and the processing degree is effectively reduced.

In addition, through the wiring board and the access board in misaligned connection, while the structural strength is improved, the access end and the wiring hole on the same side are able to be conveniently connected to the leading-out end and the motor controller, the misaligned arrangement saves axial space, meanwhile, two access ends are both located on the same side part in the extension direction of the wiring board, so that the space on the inner side in the radial direction is able to be saved, in match with uniform distribution in the circumferential direction and connection to the leading-out end, the resistance of each phase is able to be balanced, the current in each phase is able to be balanced, the single-phase terminal distributed on the inner side is able to avoid the arrangement structure of the winding and is also able to save the space of the end of the winding wire, the axial space and the radial inner pace of the motor are able to be fully utilized, and the end height and radial arrangement space of the motor winding are reduced as a whole, which is beneficial for reducing use of the volume of the motor of the stator assembly.

INDUSTRIAL APPLICABILITY

The stator assembly, the motor, the powertrain and the vehicle of the disclosure are applicable to the technical field of motors, the leading-out ends are arranged on the radial inner side of the winding part and uniformly distributed along the circumferential direction, the star point end may be distributed on the outer side or inner side and may adopt a star connection method or a delta connection method according to requirements, then the resistance of each phase is able to be balanced, the current in each phase is able to be balanced, thus the operation stability and related performance of the motor are improved, meanwhile, the axial space and radial inner space of the motor are fully utilized, the end height and radial arrangement space of the motor winding are reduced as a whole, which is beneficial for reducing use of the volume of the motor of the stator assembly.

What is claimed is:

1. A stator assembly, comprising a stator core, a stator winding and a neutral connecting assembly, the stator core is provided with a plurality of stator slots, the plurality of stator slots are distributed along a circumferential direction of the stator core, each of the plurality of stator slots is provided with a plurality of slot layers, the plurality of slot layers are distributed along a radial direction of the stator core, and winding parts of two winding wires of each phase of the stator winding are arranged in the plurality of stator slots;

leading-out ends of the two winding wires of each phase are located on a radial inner side of the winding part based on the stator core, the leading-out ends of the two winding wires of each phase are respectively led out from an innermost slot layer of the plurality of slot layers of two adjacent stator slots of the plurality of stator slots, a leading-out end of a first winding wire of each phase is uniformly distributed along the circumferential direction of the stator core, and a leading-out end of a second winding wire of each phase is uniformly distributed along the circumferential direction of the stator core;

star point ends of the two winding wires of each phase are located on the radial inner side of the winding part based on the stator core, the star point ends of the two winding wires of each phase are respectively led out from a secondary innermost slot layer of the plurality of slot layers of two adjacent stator slots of the plurality of stator slots, a star point end of the first winding wire of each phase is uniformly distributed along the circumferential direction of the stator core, and a star point end of the second winding wire of each phase is uniformly distributed along the circumferential direction of the stator core;

both the leading-out ends and the star point ends are led out towards an axial outer side of the stator core, in an axial projection of the stator core, a projection of the leading-out ends is located on a radial inner side of a projection of the star point ends based on the stator core;

the neutral connecting assembly comprises a star point connecting plate and an arc-shaped connecting plate, and there are at least three star point connecting plates and at least three arc-shaped connecting plates, a welding flat plate is provided in a middle of the star point connecting plate, a first connecting end is provided on each of two sides of the welding flat plate, a second connecting end is provided at each of two ends of the arc-shaped connecting plate, the star point connecting plate and the arc-shaped connecting plate are connected in sequence at intervals, one first connecting end is welded with one second connecting end, the first connecting end and the second connecting end are located on an axial inner side of the star point ends based on the stator core, the welding flat plate is located between the leading-out ends and the star point ends, and the welding flat plate is connected to two star point ends of each phase.

2. The stator assembly according to claim 1, wherein the first connecting end and the second connecting end are led out towards an axial inner side of the stator core.

3. The stator assembly according to claim 2, wherein the arc-shaped connecting plate is located on a radial inner side of the winding part.

4. The stator assembly according to claim 2, wherein the second connecting end is located on a radial inner side of the first connecting end based on the stator core.

5. The stator assembly according to claim 2, wherein a connecting arm is provided on each of two sides of the welding flat plate, a fixing end of the connecting arm is close to the axial inner side of the stator core and is connected to the welding flat plate, and the first connecting end is located at a free end of the connecting arm.

6. The stator assembly according to claim 3, wherein a connecting arm is provided on each of two sides of the welding flat plate, a fixing end of the connecting arm is close to the axial inner side of the stator core and is connected to the welding flat plate, and the first connecting end is located at a free end of the connecting arm.

7. The stator assembly according to claim 4, wherein a connecting arm is provided on each of two sides of the welding flat plate, a fixing end of the connecting arm is close to the axial inner side of the stator core and is connected to the welding flat plate, and the first connecting end is located at a free end of the connecting arm.

8. The stator assembly according to claim 5, wherein the star point connecting plate is formed by integrated stamping.

9. The stator assembly according to claim 5, wherein the arc-shaped connecting plate is formed by integrated stamping.

10. A motor, comprising a rotor assembly, and the stator assembly according to claim 1, the rotor assembly is rotatably arranged in the stator core.

11. A powertrain, comprising the motor according to claim 10 and a motor control apparatus, the motor control apparatus is connected to an axial end of the motor, a single-phase terminal is provided in a middle of the motor control apparatus, and the leading-out end is connected to the single-phase terminal, there are at least three single-phase terminals, the at least three single-phase terminals are uniformly distributed along a circumferential direction.

* * * * *